US011258814B2

(12) United States Patent
Janakiraman

(10) Patent No.: US 11,258,814 B2
(45) Date of Patent: Feb. 22, 2022

(54) METHODS AND SYSTEMS FOR USING EMBEDDING FROM NATURAL LANGUAGE PROCESSING (NLP) FOR ENHANCED NETWORK ANALYTICS

(71) Applicant: HEWLETT PACKARD ENTERPRISE DEVELOPMENT LP, Houston, TX (US)

(72) Inventor: Ramsundar Janakiraman, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 412 days.

(21) Appl. No.: 16/513,522

(22) Filed: Jul. 16, 2019

(65) Prior Publication Data
US 2021/0021621 A1 Jan. 21, 2021

(51) Int. Cl.
G06F 11/00 (2006.01)
H04L 29/06 (2006.01)
(Continued)

(52) U.S. Cl.
CPC .......... H04L 63/1425 (2013.01); G06F 40/30 (2020.01); H04L 43/045 (2013.01);
(Continued)

(58) Field of Classification Search
CPC .............. H04L 63/1425; H04L 43/062; H04L 43/045; H04L 41/16; H04L 41/142;
(Continued)

(56) References Cited

U.S. PATENT DOCUMENTS 7,231,393 B1 * 6/2007 Harik .................. G06F 16/3344
8,117,486 B2 2/2012 Handley et al.
(Continued)

FOREIGN PATENT DOCUMENTS

WO WO-2014209566 12/2014
WO WO-2017083191 5/2017

OTHER PUBLICATIONS

Mikolov et al., "Efficient Estimation of Word Representations in Vector Space", Sep. 7, 2013, pp. 1-12.
(Continued)

Primary Examiner — Anh Nguyen
(74) Attorney, Agent, or Firm — Sheppard Mullin Richler & Hampton LLP

(57) ABSTRACT

Systems and methods are provided for utilizing natural language process (NLP), namely semantic learning approaches, in the realm of network security. Techniques include analyzing network transaction records to form a crafted corpus related to a semantics of network activity. The crafted corpus can be adapted to include sequences of network entities that are deemed most appropriate for analyzing a particular category related to network activity. For example, crafted corpuses can include sequences of servers accessed by each user, in order to identify activity trends in a user's normal activity. A network embeddings model can be trained on the crafted corpus. The network embeddings model includes an embedding space of text that represents interactions between network entities and captures contextual similarities of text, which further measures similarities between the network entities in the embedding space. Using network embeddings model, network activity is monitored and modeled over time, and anomalies efficiently detected.

20 Claims, 12 Drawing Sheets

(51) Int. Cl.
  *H04L 43/062* (2022.01)
  *H04L 43/045* (2022.01)
  *G06F 40/30* (2020.01)
  *G06F 40/279* (2020.01)
  *G06N 20/00* (2019.01)

(52) U.S. Cl.
  CPC .......... *H04L 43/062* (2013.01); *G06F 40/279* (2020.01); *G06N 20/00* (2019.01)

(58) Field of Classification Search
  CPC ... H04L 43/0876; H04L 41/145; G06F 40/30; G06F 40/279; G06F 40/284; G06N 20/00
  See application file for complete search history.

(56) References Cited

U.S. PATENT DOCUMENTS

| | | | |
|---|---|---|---|
| 10,305,758 | B1 | 5/2019 | Bhide et al. |
| 10,354,201 | B1 | 7/2019 | Roy et al. |
| 10,803,050 | B1* | 10/2020 | Salkola ................ G10L 15/187 |
| 2005/0120105 | A1 | 6/2005 | Popescu et al. |
| 2010/0031156 | A1 | 2/2010 | Doyle et al. |
| 2012/0151561 | A1 | 6/2012 | Kreiner et al. |
| 2013/0262645 | A1 | 10/2013 | Akchurin et al. |
| 2016/0057020 | A1 | 2/2016 | Halmstad et al. |
| 2016/0374107 | A1 | 12/2016 | Das et al. |
| 2017/0004208 | A1* | 1/2017 | Podder ................ G06F 16/367 |
| 2017/0017635 | A1 | 1/2017 | Leliwa et al. |
| 2017/0091168 | A1 | 3/2017 | Bellegarda et al. |
| 2017/0262523 | A1 | 9/2017 | Epstein et al. |
| 2017/0279829 | A1 | 9/2017 | Vasseur et al. |
| 2017/0366607 | A1 | 12/2017 | Juhlin et al. |
| 2018/0004948 | A1 | 1/2018 | Martin et al. |
| 2018/0248902 | A1 | 8/2018 | Dumitrescu et al. |
| 2019/0180141 | A1 | 6/2019 | Tiagi et al. |
| 2019/0273510 | A1 | 9/2019 | Elkind et al. |
| 2019/0370347 | A1 | 12/2019 | Levy et al. |

OTHER PUBLICATIONS

Bhandari, S. et al., Cloud-Assisted Device Clustering for Lifetime Prolongation in Wireless IoT Networks, (Research Paper), Apr. 2017, 5 Pgs.

Chen, J., Semantic Information Extraction for Improved Word Embeddings, (Research Paper), May 31-Jun. 5, 2015, Proceedings of NAACL-HLT 2015, pp. 168-175.

Chung, S. et al., An Unobtrusive Interaction Interface for Multiple Co-located Mobile Devices, (Research Paper), Dec. 7, 2015, Published in: 2015 IEEE 11th International Conference on Wireless and Mobile Computing, Networking and Communications (WiMob), Retrieved Sep. 26, 2018, 3 Pgs.

Ghosh, S. et al., Neural Networks for Text Correction and Completion in Keyboard Decoding, (Research Paper), Sep. 19, 2017, 14 Pgs.

Lamba, H. et al., A Model-based Approach to Anomaly Detection in Software Architectures, (Research Paper), Retrieved Nov. 9, 2018, 10 Pgs.

Lopez, W. et al., Vector Representation of Internet Domain Names using a Word Embedding Technique, (Research Paper), 2017, 8 Pgs.

Ramachandran, A. et al., Monitoring Stealthy Network Conversations with Sampled Traffic, (Research Paper), Dec. 2006, 54 Pgs.

Rothe, S., AutoExtend: Combining Word Embeddings with Semantic Resources, (Research Paper), Mar. 13, 2017, 25 Pgs.

Anonymous Authors, Time-Dependent Representation for Neural Event Sequence Prediction, (Research Paper), 2018, 11 Pgs.

Ververidis, C. et al., Service Discovery for Mobile Ad Hoc Networks: A Survey of Issues and Techniques, (Research Paper). Retrieved Nov. 16, 2018, 18 Pgs.

Vijayalakshmi, S. et al., Mining of Users' Access Behaviour for Frequent Sequential Pattern from Web Logs, (Research Paper), Aug. 2010, International Journal of Database Managment Systems (IJDMS) vol. 2, No. 3., Aug. 2010, 15 Pgs.

Butterworth et al., "Device Discovery with mDNS and DNS-SD", Apple Inc., Oct. 5, 2009, 16 pages.

DNS SRV (RFC 2782) Service Types, available online at <http://www.dns-sd.org/servicetypes.html>, 2003 to 2010, 36 pages.

Genism, "Top Modelling for Humans", available online at <https://web.archive.org/web/20190705220216/https://radimrehurek.com/gensim/>, Jul. 5, 2019, 2 pages.

Mikolov et al., "Distributed Representations of Words and Phrases and their Compositionality", Oct. 16, 2013, pp. 1-9.

Pennington et al., "GloVe: Global Vectors for Word Representation", Oct. 2014, 12 pages.

* cited by examiner

| File | Edit | Format | View | Help | | | | |
|---|---|---|---|---|---|---|---|---|
| | | | | | | 300 | January 14, 2018 | |
| | | 350 | 351 | 352 | 353 | 354 | 355 | |
| | | ServerName | DatabaseName | LogsGenerated | DurationInSeconds | Usernames | TimeStamp | |
| | | ex-08-07 | ex-08-db151 | 135 | 277213 | UserA | 09:01:23 | |
| | | ex-03-05 | ex-03-db039 | 115 | 86394 | UserB | 09:01:44 | |
| | | ex-08-11 | ex-08-db240 | 2068 | 172839 | UserB | 09:01:49 | |
| | | ex-02-09 | ex-02-db127 | 118 | 86405 | UserA | 09:01:52 | |
| | | ex-04-10 | ex-04-db223 | 26 | 86405 | UserD | 09:01:52 | |
| | | ex-05-03 | ex-05-db242 | 845 | 68407 | UserC | 09:02:06 | |
| | | ex-09-05 | ex-09-db251 | 4705 | 316826 | UserD | 09:02:07 | |
| | | ex-01-07 | ex-01-db021 | 227 | 190798 | UserA | 09:02:09 | |
| | | ex-08-07 | ex-08-db061 | 592 | 82792 | UserB | 09:02:30 | |
| | | ex-01-09 | ex-01-db217 | 4635 | 410411 | UserC | 09:02:38 | |
| | | ex-03-02 | ex-03-db242 | 4717 | 597654 | UserC | 09:02:54 | |
| | | ex-08-11 | ex-08-db178 | 1885 | 172807 | UserC | 09:03:23 | |
| | | ex-08-07 | ex-08-db106 | 10134 | 597604 | UserD | 09:06:13 | |

FIG. 3A

| 460 | | | | | | |
|---|---|---|---|---|---|---|
| UserA accessed Server ex-08-07 on January 14, 2018 at 9:01:23 | Morning |
| UserA accessed Server ex-02-09 on January 14, 2018 at 9:01:59 | Morning |
| UserA accessed Server ex-01-07 on January 14, 2018 at 9:02:09 | Morning |
| UserA accessed Server ex-08-07 on January 14, 2018 at 9:02:30 | Morning |
| Server ex-08-07 accessed by UserA on January 14, 2018 at 9:01:23 | Morning |
| Server ex-08-07 accessed by UserA on January 14, 2018 at 9:02:30 | Morning |
| Server ex-08-07 accessed by UserD on January 14, 2018 at 9:06:13 | Morning | 465 |

FIG. 4C

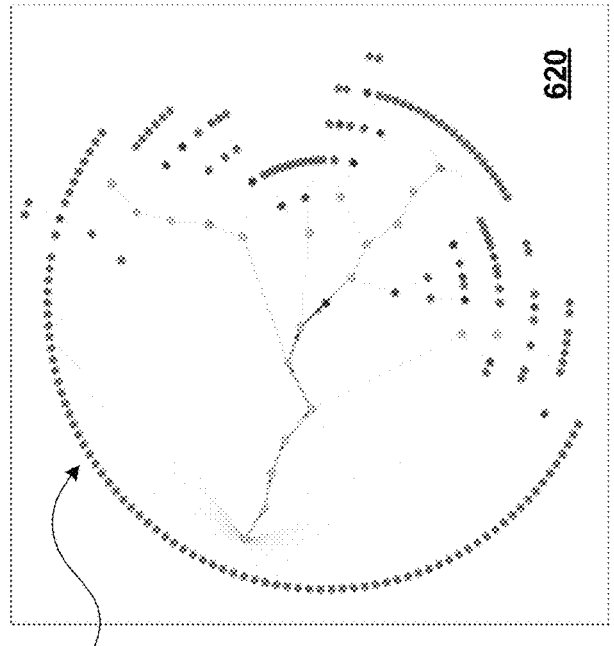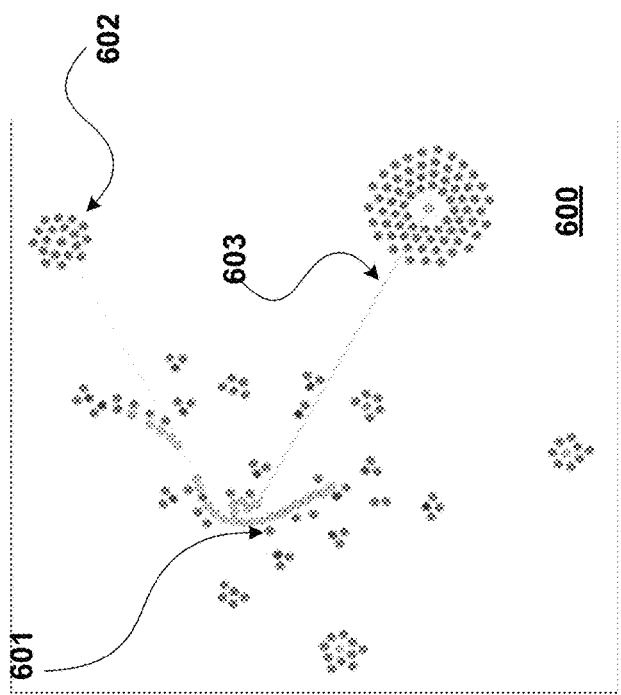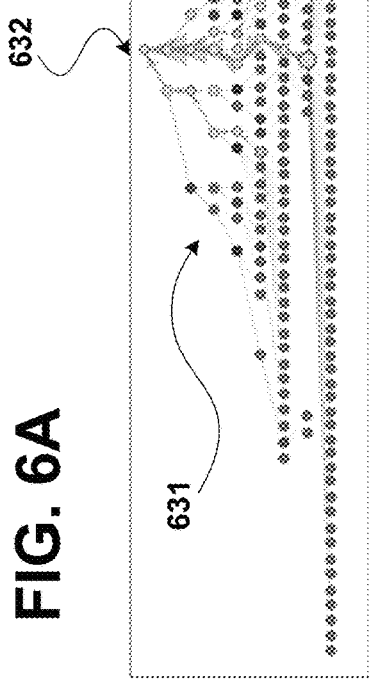
FIG. 6A
FIG. 6B
FIG. 6C

METHODS AND SYSTEMS FOR USING EMBEDDING FROM NATURAL LANGUAGE PROCESSING (NLP) FOR ENHANCED NETWORK ANALYTICS

CROSS REFERENCE TO RELATED APPLICATIONS

This application is related to co-pending and co-owned U.S. patent application Ser. No. 16/374,728 filed on Apr. 3, 2019, entitled "METHODS AND SYSTEMS FOR DEVICE GROUPING WITH INTERACTIVE CLUSTERING USING HIERARCHICAL DISTANCE ACROSS PROTOCOLS", which is hereby incorporated by reference herein in its entirety.

DESCRIPTION OF RELATED ART

In the realm of network security, it may be beneficial for security analytics products to increase the accuracy in the results they provide, as a way of gaining customer trust and raising confidence in use of the products themselves. As an example, there may be significant value in the area of network security for software that includes the capability to differentiate outliers that may be captured (but do not verifiably indicate a security threat) from the valid detected anomalies within the network, in a robust manner. Furthermore, with various advancements in Natural Language Processing (NLP), for example pertaining to semantic learning and auto-encoding, it may be possible to leverage text-based analysis (e.g., learning semantics) in a manner that requires limited human interaction and further may be applied to highly automated processes, such as network monitoring.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A illustrates an example of a network transactions log including records relating to network activity in the communications network shown in FIG. 1, according to some embodiments.

FIG. 4C illustrates an example of a crafted corpus for capturing sequences of groups of users accessing groups of servers in a network embedding space and using data from the transactions log shown in FIG. 3A, according to some embodiments.

FIGS. 6A-6C depict examples of network graphs generated using visualization aspects of the network analytics system disclosed herein, according to some embodiments.

Figure 1:
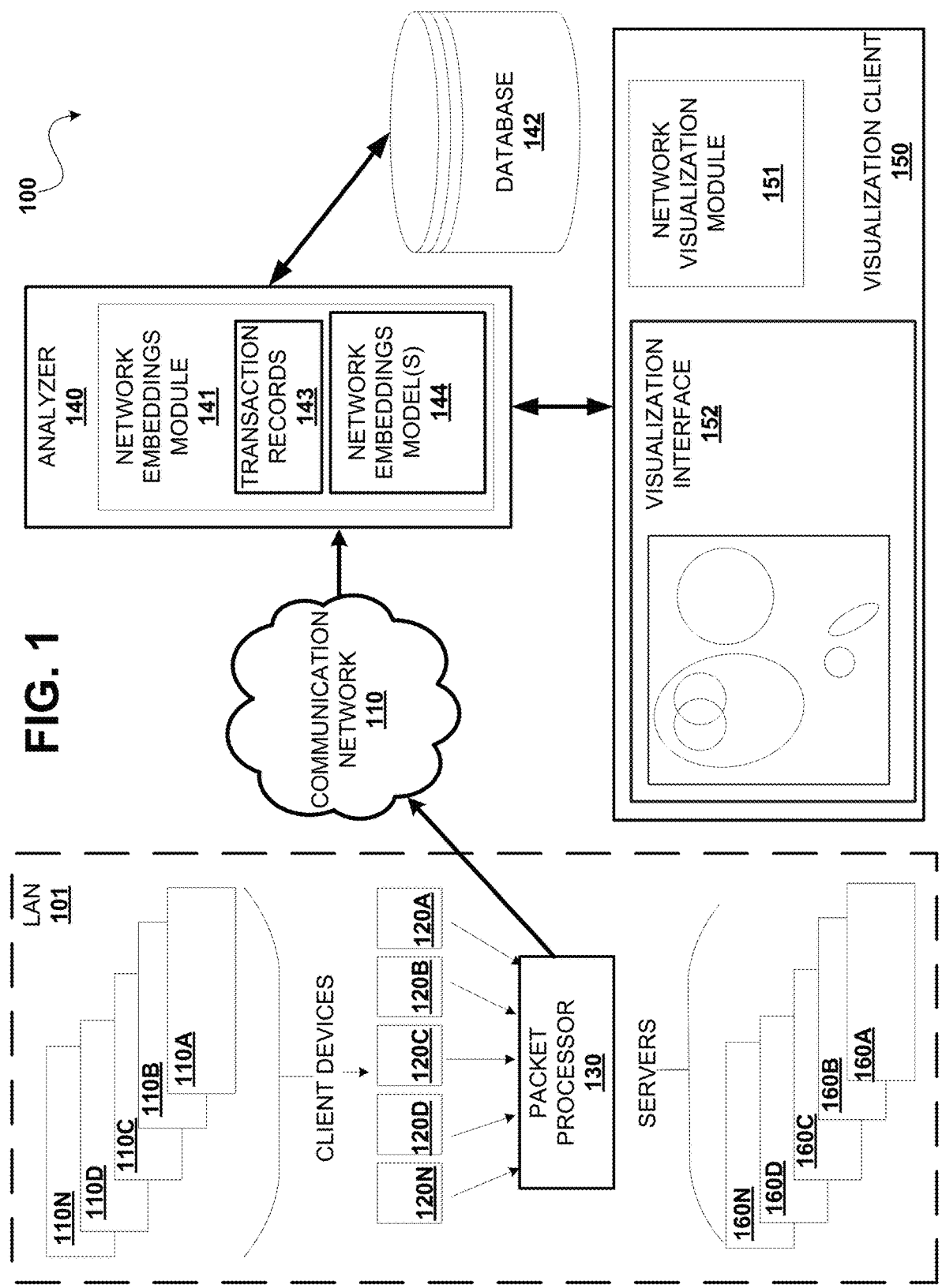
FIG. 1 illustrates an example of a system distributed across a communications network and including a network device implementing techniques for deriving network analytics using network embeddings modeling, according to some embodiments.

The figures are not exhaustive and do not limit the present disclosure to the precise form disclosed.

DETAILED DESCRIPTION

Various embodiments described herein are directed to techniques and systems for using a semantic learning approach, namely embedding, which is a concept in Natural Language Processing (NLP), particularly in the realm of communication network security and/or network analytics. For example, some existing network monitoring systems have the capability to collect vast amounts of data from network traffic, such as interactions amongst entities within an enterprise network. Nonetheless, gaining valuable insight from such data for purposes of network security and/or analytics, such as recognizing access trends can present numerous challenges. Due to privacy concerns (e.g., personal identification information) and high data volume, data is often times unlabeled. As a result, data collected from the network may be disassociated from user identifiers, and other types of information that may provide valuable context with respect to security. Even further, separate networks can have distinct layouts, architectures, and operations that are specific to the respective network. These disparities between networks can grow even farther when observed across a large population (e.g., global business), which does not lend itself to a universal analysis approach that can easily and effectively transfer across a plurality of networks (e.g., in terms of customer to customer, and also in terms of the deep learning transfer learning).

Advantageously, the disclosed embodiments can leverage NLP to represent network interactions as semantical structures (e.g., characters, words, sentences), with the network protocol being analogous to a spoken language defining the semantics. For example, the disclosed techniques can represent transaction records (related to an interaction between network entities) as vectors in a dimensional space as applied to natural language sentences, using embedding models. As such, NLP techniques can be further applied to the analyze interactions, as indicated by the transaction records, in manner similar to analyzing contextual relationships between words in a sentence based on the semantics. The embedding techniques disclosed herein can ultimately capture network behavior, recognizing similarities and occurrences between interactions and thereby adding contextual worth to data that may otherwise be less meaningful in convention network security techniques.

As discussed herein, NLP can be generally described as multiple theory-driven computational techniques for the automatic analysis and representation of human language. NLP, referred to herein, may be processes that involve computers performing a wide range of natural language related tasks at various levels, such as parsing, and pattern recognition. Recent advancement in deep learning, for instance applying neural networks for dense vector representations, has further improved some NLP-based tasks. Closely related to the this trend of deep learning within NLP is the concept of word embeddings.

In some approaches, NLP can be used to model complex natural language tasks. A drawback of some traditional NLP-based modeling techniques involves dimensionality. Dimensionality is often associated with challenges that are characteristic of analyzing and organizing data in high-dimensional spaces (often with hundreds or thousands of dimensions). This led to the emergence of models that learn distributed representations of words existing in low dimensional space, including embeddings. Embedding techniques (e.g., character, word, sentence, and paragraph) have been used for dimensionality reduction and sematic deduction to improve accuracy and performance improvements of NLP modes. Generally, embedding techniques have been employed to understand word relationships in a document or "corpus." As referred to herein, corpus can be defined as a body of words within a text or collection of texts. Accordingly, an advantage of embedding (e.g., distributional vectors) is its ability to capture similarity between words. Furthermore, measuring similarity between vectors is possible. Embeddings, due to these characteristics, can be useful as a processing layer in a deep learning model.

As described herein, word embeddings can be described as a vector representation (e.g., vector of numbers) of a document vocabulary which is capable of capturing the context of the words in a document. Transaction records are data structures that include data related to interactions between entities within a network (e.g., Netflow records or Flow records with deep packet inspection information). For instance, text of a transaction record can be parsed to extract information linked to an interaction, such as which server within an enterprise is accessed by a particular user, by correlating with Active Directory or other Authorization logs, during a network communication. These transaction records can be subjected to text-based analysis, where the data included in each transaction record can be viewed as natural language words. Similarly, transaction records can be equivalent to sentences (referred to as network activity sentences). Thus, collecting a vast collection of data from multiple transactions over a period of time can build a "corpus" of the network activity which drives formulation of the embedding space. It should be appreciated that although network embedding techniques are described with respect to transaction records for purposes of illustration, that the disclosed techniques are not limited to transaction records and can be applied to various other types of structures that contain relevant information usable to formulate the corpus, such as firewall logs.

Figure 2:
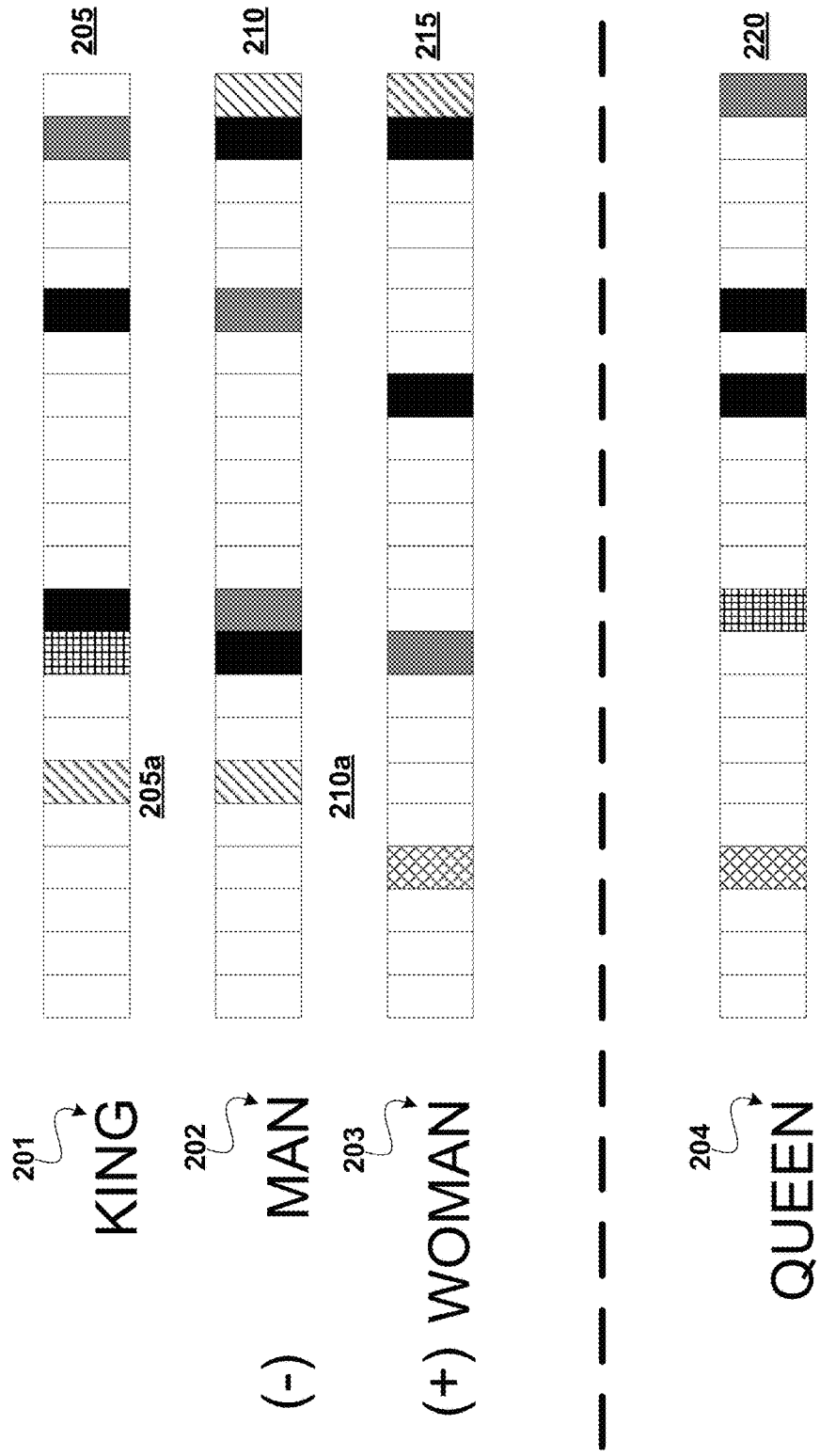
FIG. 2 is a conceptual diagram of examples of word embeddings, according to some embodiments.

Distributional vectors, or word embeddings, can be described as applying a distributional algorithm, according to which words with similar meanings tend to occur in similar context. A conceptual example of word embeddings is illustrated in FIG. 2. As seen in FIG. 2, word embeddings can be formulated from various words, namely "King" 201, "Man" 202, "Woman" 203, and "Queen" 204, in reference to the example. Often times word embeddings can be derived from observing words that are grouped together, such as in a sentence. Referring to the example, words "King" 201, "Man" 202, and "Woman" 203 may be in the same sentence (or occurring in a number of sentences observed over a period of time), where it can be assumed that the words 201, 202, and 203 have some level of contextual relationship due to natural language semantics and syntax. By employing word embedding techniques, each word can have its own corresponding vector representation, shown in FIG. 2 as: "King" 201 being represented as vector 205; "Man" 202 being represented as vector 210; "Woman" 203 being represented as vector 215; and "Queen" 204 being represented as vector 220. Thus, these vectors 205, 210, 215, and 220 in embeddings can capture contextual characteristics of the neighboring words. Similarities between the vectors 205, 210, and 215 can be measured, which is indicated in FIG. 2 by highlighted vector elements. In the illustrated example, shaded vector element 205a in vector 205 for the word "King" 201 and shaded vector element 210a in vector 210 for the word "Man" 202 can indicate that there are similarities measured in the vectors 205, 210. This can represent that there is some shared compositionality in the words "King" 201 and "Man" 202 capturing a contextual relationship between the words.

As an example of a natural language context, it can be ascertained that a "King" 201 is also a "Man" 202 based on English definitions, thus the words have some similarity. Further, FIG. 2 shows that in adding context associated with the word "Woman" 203 to the abovementioned relationship, word embeddings may be used to predict an occurrence of another related word. That is, in a context derived from semantic information given by vectors 201, 202, and 203, "Queen" 204 can be predicted to occur in a similar context, having a similar meaning to "Woman" 203 near Word "King" 201. Some existing NLP-driven applications use embeddings as the building blocks to build sequence prediction models, such as auto-completion. In the case of auto-completion, NLP tasks may train a model using the example in FIG. 2, applying the learned vectors 205, 215, and 220 to future occurrences of receiving "King" 201, 'Man" 202, and "Woman" 203 in context, to automatically predict an output of "Queen" 204, for example to complete auto-populate a search bar of web application with a complete sentence. (Reference: Mikolov, Tomas, et al. "Distributed representations of words and phrases and their compositionality," Advances in neural information processing systems. 2013, pp. 3111-3119.)

In the absence of embeddings, each word would be represented by one-hot encoding that places each word in their own ortho-normal space without any relations. Alternatively, with embeddings as representation of the words in a continuous relational space, the models can be made more accurate and also made faster to train due to the reduction in the dimensionality required to represent the words (as compared to one-hot encoding). The disclosed techniques extend the practical application even further, utilizing systems and techniques that can adapt NLP approaches to be effective in network security.

For example, in the realm of computer networking, a "sentence" can be considered a network interaction that is captured for analysis by their corresponding transaction records. A "sentence" of servers can include several servers in related interactions that may be grouped together, for instance by the users accessing them. As such, another capability of the word embeddings techniques include the flexibility to generate, or craft, a corpus that is customized to the particular entities to be captured in a unified embedding space. For example, in order to create an embedding space to capture sever groups, a corpus can be crafted which specifically include sequences of servers grouped for a particular user. As another example, to achieve an embedding space of users with common workflow along temporal proximity (e.g., within the same day), the corpus can be crafted to include sequences of users for a particular server. Consequently, the disclosed "crafted corpus" features can allow for flexibility in the embeddings approach, allowing the techniques to be highly adaptable for a specific application and/or to be modified for continued use across multiple varying networks.

The disclosed embodiments also generate embeddings models based on word embeddings techniques. As alluded to above, word embeddings can be used to build a vector representation of transaction records with crafted sequence formulations (e.g., network activity sentences). As described herein, applying word embedding techniques to network transactions are referred to as "network embeddings." Then, in a manner similar to measuring vectors to capture relationships between natural language words, network embeddings that include vectors of transaction records can be used to form contextual relationships between network interactions. For instance, interactions involving the same entity (or entities) can be characterized as tending to occur in a similar context, in the same way that sentences including words with similar meanings tend to have similar context. Furthermore, training an embeddings modeling, generated from learned network activity sentences over some time period can be effective in developing contextual similarities in network activities. An embeddings model generated from a crafted corpus of transactions records can be described as a "network embeddings model." As an example, a network embeddings model representing the access patterns of a particular user in the network at the same time of a day, can be analyzed to determine whether an interaction can be considered within the context of a user's learned network behavior. Alternatively, embedding models can be used to recognize when an interaction in out-of-context, which may be indicative of an anomaly. In the embodiments, embedding models are used as a building block in the DNN (where the embedding layer can be trained outside the model in an unsupervised way) framework, which can be used to identify trends in network activity and detecting anomalous activity. Moreover, due to smaller dimensionality associated with embeddings models, their use in network analysis can provide the added benefits of fast and efficient computation of NLP tasks, thereby reducing the impact on the overall efficiency of running analytics.

Although the system and techniques are described in reference to word embeddings, it should be appreciated that other types of embedding approaches that are applicable to NLP-based analysis, such as character embeddings, sentence embeddings, and contextual embeddings, can be applied in lieu of, or in addition to, word embeddings techniques discloses herein. For example, sentence embedding can be used to capture the semantics of the sequence of access among network entities. Accordingly, sentence embedding can build from the use of words embedding (which focus on an individual network entity), where the sentence embeddings provide an understanding of the semantics of the sequences themselves. In other words, the sequence of the entities accessed can build non-contextual individual entity embeddings.

Furthermore, embodiments can extend the use of word embedding techniques into various network security applications. The disclosed system and techniques can include a graphical user interface (GUI) which further provides a visualization of the network (e.g., network entities), as derived from analysis of word embedding models. In an example, a network visualization can display visual represents of an embedding space. A user interacting with the GUI, for instance a network administrator, can visually compare the displayed embedding space against their understanding. As word embeddings can capture the network's activity over time, a visualization of the network modeled using these word embeddings can show network interactions in a manner that provides a user-friendly and easily recognizable indication of anomalies (e.g., outlier in the embedding space). Additionally, in some embodiments, the above-mentioned visualization can be used to display anomalous access patterns based on the word embedding techniques. Further, the visualization can have additional interactive features, such as filtering out some outliers that may be within a safe buffer (e.g., temporary access granted to a user), thereby mitigating false positives and improving accuracy of the network security functions. As a general description, systems and techniques disclosed herein can implement various interactive features pertaining to network analytics, such as network visualization, clustering, network monitoring, access pattern analysis, and network anomaly detection. Thus, the embodiments allows a user to interact with and configure aspects of the NLP-based network analytics, namely the word embeddings techniques.

Moreover, network analytics driven by the word embeddings techniques can provide validation of the network coverage or lack thereof. When embedding relations indicate a violation of expected network behavior (e.g., network administrators determine rules or behavior observations), the root cause can either result from problems relating to data collection or a real behavioral understanding gap from the real world. Validation through word embeddings can lead to disambiguation in this regard. Also, the validation of the data collection can be provided through word embeddings. Drastic changes in embedding definition of network entities can mean that a significant change in the network has occurred, or that anomalous behavior has transpired in the network. In an example, an embedding space of entities that include applications and their servers after a service rollout or a migration of service from one resource to another can be analyzed in accordance with the techniques described herein.

Referring now to FIG. 1, an example of a system 100 distributed across a communications network 110 and including a network device, shown as analyzer 140 for implementing the disclosed network embedding techniques is illustrated. The analyzer 140 can be configured for implementing various NLP-driven techniques (e.g., semantic learning, word embeddings, etc.) for enhanced network analytics, according to some embodiments. In some embodiments, the analyzer 140 can be a centralized computer, such as a server, having a processing capacity that is suitable to support the data processing and analysis necessary to implement the network embeddings features disclosed herein. Details describing the function and capabilities of the analyzer 140 are further described throughout.

In FIG. 1, an example network architecture includes clients devices 110A-110N, servers 160A-160N, and packet processor 130 that can be proximately located, for instance within the same customer premises. Additionally, the client devices 110A-110N, servers 160A-160N, and the packet processor 130 can be communicatively connected to each other as part of a local area network (LAN) 101 (indicated by dashed lines). LAN 101 may be installed at the customer premises, such as in retail a store, a business (e.g., restaurants, shopping malls, and the like), a factory, an office building, and the like. In that regard, LAN 101 may include one or more of the clients devices 110A-110N.

Client devices 110A-110N may include a desktop, a laptop, or a mobile device such as a smart phone, a tablet, or any other portable computing device capable to communicate through LAN 101. In that regard, for example, client device 110A may include several types of devices, which, even in the case that client device 110A is mobile, may be loosely or less often associated or co-located with a user. Another type of client device 110B, for instance, may be more often or almost always associated or co-located with a user (e.g., a smart phone or another wearable device). As illustrated, the plurality of client devices 110A-110N can attempt to communicate with, or otherwise access the servers 160A-160N on LAN 101. In the illustrated example, servers 160A-160N include hardware and software to provide data and/or services for consumption by client devices 110A-110N. For example, a server 160A can include a web-based application that handles and delivers e-mail over a network, typically over the Internet. Thus, certain client devices, for instance client device 110A, may be used by an employee that connects to server 160A for communicating via e-mail. Another server, such as server 160B, can act as a finance server for a business, and thus can provide certain financial applications (e.g., sales portals) and financial documents. In some cases, access to a finance server 160B may be limited to certain client devices on the LAN 101, for example devices that belong to those employees in the financial department. An employee within the financial department may have permission to financial aspects of the business, such as accounting personnel. Accordingly, a client device 110B, used by an accountant, may access server 160B in order to perform financially based tasks. Alternatively, client device 110A may not have a need for (or may be restricted from having authorization) accessing server 160B.

Continuing with the example, another server on LAN 101, such as server 160C, can provide another distinct service. Server 160C, for instance, can be a code repository server that supports multi-developer projects by hosting source code (e.g., allowing developers to submit and/or access patches of code). As such, client devices that may be used by software engineering employees of a business, as an example client device 110C, may access the server 160C in order to perform various software development tasks. In an example of another network architecture, LAN 101 can include multiple subnets that are assigned to each of the various departments described above. Thus, the network activity for a respective client, such as client device 110A can be characterized interacting with other network entities within its respective subnet.

In some scenarios, the client device 110C may access one or more additional servers, alongside of accessing code repository server 160C that may be assigned to an engineering department. The additional servers may provide services that are related to coding, for example, and can be used while the client device 110c is being used for working on software development projects. In an example, server 160D can act as a bug repository that keeps track of reported software bugs in software development projects. Accordingly, in some cases, client device 110C being utilized by a software engineer may access both server 160C and server 160D concurrently.

Each of the abovementioned examples can be generally described as exemplifying departmental workflows, or access trends of client devices 110A-110N with respect to the network resources within LAN 101 that may be assigned to their respective departments. That is, there can be access patterns established by the typical workflow of an employee within a department, for example. As described above, clients devices 110A-110N used by employees in a particular department, such as the financial department, engineering department, and the like can often times have similarly reoccurring network activity. For example, each employee may have a specific workflow involving repeated network activities. Even further, multiple employees may share similarities in their workflow on the departmental level, where employees in the same department have commonly shared network activities. Network activity with respect to these departmental workflows (or employee workflows) can also translate to transactions records that have identifiable similarities, such as similar source/destination pairs, repeated times and/or frequency of access, and other attributes relating to interactions between entities on the LAN 101. Over time, analyzing network activity, such as interactions relating to departmental workflows, can be indicative of trends that can be considered normal in the network. Patterns involving which client devices 110A-110N access which servers 160A-160N within the network can be identified, analyzed, and modeled. As an example, it may be observed that a user of client device 110A often times has the workflow of accessing e-mail server 160A Monday-Friday between 9:00 am-9:30 am (e.g., responding to emails at the start of the work day), working on a spreadsheet or a document on a document repository, followed by printing the spreadsheet/document on a secure printer.

As illustrated in FIG. 1, the packet processor 130 can passively collect and analyze the traffic in a network, such as LAN 101. In the example of FIG. 1, the packet processor 130 can collect packets 120A-120N that are transmitted from and/or received by clients 110A-110 in accessing servers 160A-160N during an employee's normal workflow. In some cases, packet process 130 can collect other forms of intent to access messages including information relating to network interactions, such as discovery protocol messages as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. Accordingly, these collected packets 120A-120N can be used to compile a log of transaction records (e.g., conversations) 143 at an analyzer 140. The transaction records 143 can then be analyzed using the NLP-based techniques disclosed herein. Transactions records 143 can include information communicated in accordance with one or more network discovery protocols, such as dynamic host configuration protocol (DHCP), a domain name service (DNS), a multicast DNS (mDNS) protocol, a link layer discovery (LLDP) protocol, a CISCO discovery protocol (CDP) that include information content about the network. Also, transaction records can include information in accordance with network protocols, such as transmission control protocol (TCP). It should be appreciated that other types of protocols and information that allows devices to operate in the network can be collected and analyzed using the techniques disclosed herein. An example of a log comprised of transaction records 143 that can be used by analyzer 140 is shown in FIG. 3A.

Also, FIG. 1 serves to illustrate that the analyzer 140 includes a network embeddings module 141. The network embeddings module 141 can program the analyzer 140 to execute various functions that allow the analyzer 140 to implement network embeddings for network analysis, in accordance with the NLP-driven techniques described herein. Furthermore, according to various embodiments, the network embeddings module 141 and components described herein may be implemented in hardware and/or software that configure hardware.

The network embeddings module 141 can be configured to create a crafted corpus from data indicative of network activity, such as the data included in transaction records 143. In NLP, a corpus can be defined as a body of words. In a similar manner, the analyzer 140 can generate a corpus, or sequence of "words" that forms the semantics used in network-based communication between entities on LAN 101. As an example, the analyzer 140 may be configured to analyze the network activity of a particular user whom accesses assets on LAN 101, for instance client device 110A. The analyzer 140 can perform NLP-driven analysis on data, from transaction records 143 for example, that is specific to the network activity that involves client device 110A. In some embodiments, the network embeddings module 141 can generate a "crafted" corpus, as previously described. In continuing with the above example, the network embeddings module 141 can particularly structure a crafted corpus in order to capture network activity of client device 110A in an network embeddings space. Thus, in a scenario, a crafted corpus formulated by the network embeddings module 141 can include sequences of servers in LAN 101 that client device 110A interacted with during a single session, for instance.

A described herein, a network embedding module 141 can formulate a crafted corpus that is structured in accordance with one of three principal categories, including: 1) a crafted corpus of servers, per user (e.g., per session); 2) a crafted corpus of users, per server (e.g., per day); and 3) a crafted corpus of a group of users, per group of servers accessed. Additionally, in some instances, the same corpus can include a sequence of the source internet protocol (IP) address, for example, of the devices from which access to a server was initiated. In these example, the crafted corpus may group source IP address by server). As an example, a crafted corpus including a list of servers grouped by users, and including a list of source users grouped by servers will provide user and server behavior (embeddings of two discrete entities) in a single embedding space shows cohesiveness within each entity, but not across the entities. In other words, the crafted corpus may capture cohesiveness within the servers grouped by users, and then separately capture the cohesiveness within users grouped by servers. However, in some embodiments, this concept can be extended across multiple entities, for example entities sharing like applications, or type of transaction (e.g., down vs upload). Consequently, embeddings of two otherwise discrete entities may be merged, and further showing cohesiveness across them. As an example, a crafted encoded corpus may be formulated to include a sentence "user A accessed Server B", which can yield a merged space, where cohesiveness across the groups of servers and the groups of users can be represented.

Figure 4A:
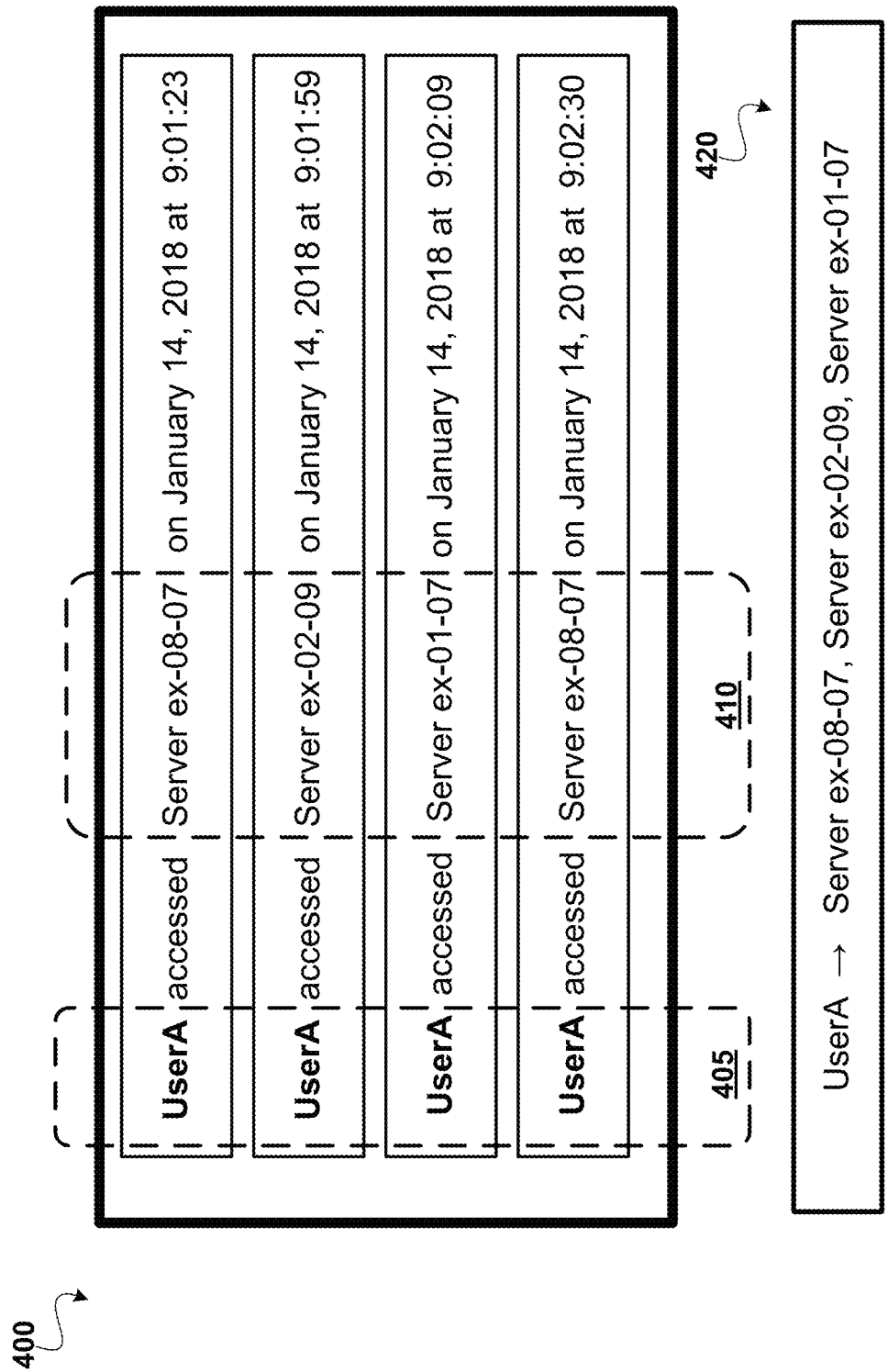
FIG. 4A illustrates an example of a crafted corpus for capturing a sequence of servers in a network embedding space using data from the transactions log shown in FIG. 3A, according to some embodiments.
Figure 4B:
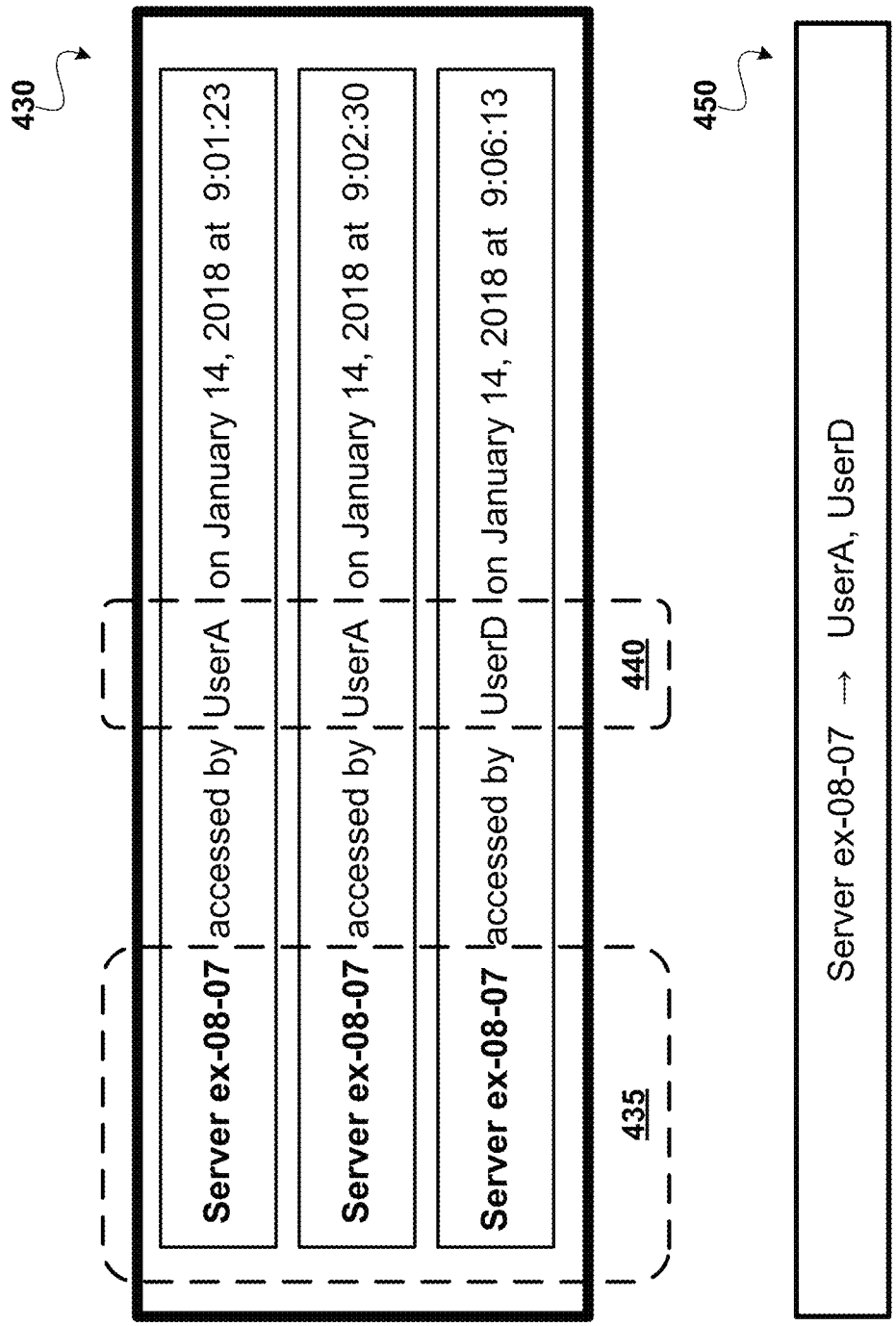
FIG. 4B illustrates an example of a crafted corpus for capturing a sequence of users in a network embedding space using data from the transactions log shown in FIG. 3A, according to some embodiments.

Although the aforementioned categories are described in detail for purposes of illustration, it should be appreciated that the network embeddings techniques can adapt a crafted corpus in a manner that does not fall under these categories. As such, a crafted corpus can be structed to represent any network entity (also referred to herein as network asset) or other data relating to network activity as deemed necessary and/or appropriate for a certain network security application. Examples of crafted corpuses structured in each of the categories are illustrated in FIGS. 4A-4C, and are discussed in greater detail below. In some instances, a crafted corpus can include data related to communication networks such as hostnames, protocol information (e.g., TCP), ports, IP address, MAC addresses, remote addresses, authentication information, activity description, timestamps, ping times, client devices, network users, network asset state information, log files, HTTP code, pages requested, user agents, referrers, bytes served, errors, active directory logs, proxy logs, etc.

Furthermore, by executing the network embeddings module 141, the analyzer 140 can use a crafted corpus to generate vector representations of the network assets in a monitored network, such as LAN 101. For example, the network embeddings module 141 can extract each network asset, application name, and other deep packet information from the network transaction records in a crafted corpus and develop a vector representation which exemplifies the presence of network assets that are proximate to each other (in the context of network activity). Proximity is referred to herein with respect to which network assets are near each other. The network analyzer 140 may be able to measure proximity by determining that a network asset is listed in a transaction log within a defined range from another "proximate" asset, for instance proximate network assets are listed within three entries of each other in the transactions log. In some cases, proximity may be determined with respect to time, also referred to herein as temporal proximity. For example, proximity may be established if a network asset is listed within a certain time window, for example fifteen minutes, of another network access request. Furthermore, the concept of proximity, or measuring distance, between network entities can be captured by network embeddings. The network embeddings module 141 can generate a vector representation of a network entity that reflect its proximity to other network entities captured in the crafted corpus. For example, the network embeddings module 141 can generate a network embedding that represents a number of times that an assigned network entity is found near other (potentially proximate) network assets within the crafted corpus. Network embeddings are discussed in greater detail in reference to FIGS. 4A-4C.

Also, FIG. 1 shows that the analyzer 140 can include embeddings model(s) 144. Typically, embedding model(s) 144 are a result of NLP-driven analysis of a crafted corpus. Embeddings model(s) 144 may be implemented as a vector space model that represents (e.g., embeds) network entities in a continuous vector space. Consequently, semantically similar network entities can be mapped to nearby points (e.g., embedded nearby each other) within the network embeddings model(s) 144. Network embeddings model(s) 144 may depend on the distributional hypothesis, as alluded to above, which posits that network entities that appear in the same, or similar, contexts are related. Additionally, the network embeddings models(s) 144 may be implemented as count-based models (e.g., latent semantic analysis) and predictive models (e.g., neural probabilistic language models) that also leverage the distributional hypothesis. Count-based models may also include processes to compute the statistics of proximity, for instance how often some network entities appear next to each other within a network activity log (e.g., transactions log). Predictive models, on another hand, attempt to predict the use of a network entity, or asset, from its neighboring entities within a network activity log in terms of learned, small, dense, embeddings vectors. A determination of which of these abovementioned methods are employed can be based on various variables, which may be related to system constraints, such as how much data is available and the availability of compute and memory in the compute resources. These embeddings vectors may be implemented as parameters of the network embeddings model(s) 144.

Additionally, FIG. 1 shows a network visualization client 150 including a network visualization module 151. The visualization client 150 may be a client device having network analysis applications, such as the visualization interface 152, that consumes the analytical data processed by analyzer 140. As an example, the visualization device 150 can be a desktop, a laptop, or a mobile device such as a smart phone, a tablet, or any other portable computing device that can be used by a network administrator for monitoring a network, such as LAN 101. In some instances, the visualization client 150 and the analyzer 140 are communicatively connected via a network (not shown) allowing communication of data between the devices. In the embodiments, the network visualization module 151 includes executable instructions, computer components, or a combination of both that implement a visualization of the network. An example of a visualization of network embeddings model(s) 144 is shown in FIG. 1 as output of a visualization interface 152. As previously described, the network embeddings model(s) 144 can be a vector space of network entities having distances measured between them based on semantic similarities. In other words, a visualization of the network embeddings model(s) 144 can include a visualization of the representations of devices that are grouped together, or displayed as proximate to each other, based on sharing similar context. For instance, client devices 110A-110N having a common workflow from being employees in the financial department (e.g., accessing the same servers, printers, etc.) may be deemed semantically similar in the network embeddings model(s) 144, and therefore may be mapped nearby to one another (forming a group) in the visualization. Similarly, client devices 110A-110N that have a common workflow from being employees in the engineering department may be mapped in close proximity to each other in the visualization, forming a group that has a greater distance from devices in other departments.

The visualization interface 152 is illustrated in FIG. 1 as displaying a visualization of a network embeddings space. The network visualization module 151 can present a visual representation of the cohesiveness of the relation in a reduced dimensional space, such as in a two-dimensional (2D) or three-dimensional (3D) space. In most cases, visualization of the network embeddings can be performed without loss of information during the dimensionality reduction by using the techniques similar to t-Distributed Stochastic Embedding (t-SNE). In the example, the visualization interface 152 can display the graph shown in FIG. 1 as a result of analyzer 140 performing network embeddings on interactions between the network entities on LAN 101, in accordance with the embodiments. The network graph displayed in the visualization interface 152 can be a visual representation of a topological view of a network (based on semantics learning), having visual cues, for identifying network entities, network activity and traffic in networks. Furthermore, a user can interact with the visualization interface 152 to allow the visualization to be generated in an interactive manner. For instance, the visualization interface 152 can receive input from a user (e.g., select a simple outlier) that modifies to the visualization. The visualization client 150 can include an input device, and an output device. Input device may include a mouse, a keyboard, a touch-screen, and the like, that can be utilized by the user to interact with the visualization. An output device of the visualization client 150 may include a display, a touch-screen, a microphone, and the like, which displays a visualization. In some embodiments, input device and output device of the visualization client 150 may be included in the same unit (e.g., a touchscreen).

In some embodiments, the analyzer 140 also includes various capabilities related to network security, such as monitoring network activity. By applying the disclosed network embeddings techniques to effectively group like entities in a network (based on contextual similarities), system 100 addresses challenges that can arise in developing network security systems (e.g., distinguishing between members of a particular group or set, considering authorization and/or permissions in certain network interactions, and the like). As a result of using NLP-driven grouping for the visualization, the visualization interface 152 can graphically represent a continuous vector space where network activity that is normal for a group is visualized with respect to position in the vector space (e.g., smaller distance), and alternatively network activity that is anomalous, or out of context for a given group (e.g., substantially large distance) can be graphically presented by visualization interface 152.

An anomaly, as referred to herein, may be an event that deviates from what is standard, normal, or expected. Generally, network security systems are designed to identify anomalies as events that are more likely to indicate unauthorized access, misuse, malfunction, modification, destruction, or improper disclosure. The inability for a network security system to effectively distinguish between simple outliers and anomalies often leads to false positives. A significant degree of false positives can cause network security administrators to lose confidence in a network security system to generate quality alerts which may make the network system even less secure due to a lack of sufficient inspection. However, system 100 leverages the power of NLP-driven processing to facilitate the network visualization module 151, and mitigate false positives (e.g., easily identify simple outliers) to improve the overall accuracy of detecting anomalous network behavior by using network embeddings.

In accordance with the embodiments, utilizing network embeddings to model network activity can be leveraged to identify nominal network activity for the purposes of network monitoring and/or security. For instance, in referring again to the examples described above, network interactions within LAN 101 can be analyzed in the context of their departmental workflow, and described as: client device 110A used by a staff employee commonly accesses server 160A acting as an e-mail server; client device 110B used by an accountant has commonly accesses server 160B acting as a finance server; and client device 110C used by a software engineer commonly accesses servers 160C and 160D acting as code repository and bug repository, respectively. The analyzer 140 can employ the network embeddings module 141 to train network embedding model(s) 144. Network embeddings can capture the sequence of server accesses by a user and can embed the semantics of the server according to departmental rules, trends, and/or purpose of the resource on the network. For example, when a word embeddings model is employed to train an example corpus, the embedding model(s) 144 may group a plurality of finance servers and engineering servers in proximity of each other, respectively, in a high-dimensional embeddings space. Then, the network visualization module 151 can generate a visualization of the embedding model(s) 144. The visualization module 151 can implement word semantic visualization techniques, like t-SNE to generate a visualization that includes visual representations of these contextual relationships from the learned embeddings in the model. As an example, servers that are determined to be a part of a workflow for a user can be shown in the visualization as nearby points (also referred to as forming a cluster). A user interacting with the visualization interface 152 can then interpret the visual data, making network activity within the network visually discernable. As shown in the example of FIG. 1, the visualization interface 152 can present a visualization including clusters that are identified from user interaction. A user can enter user input into the visualization interface 152, such as haptic input using a touchscreen, in order to highlight a group of proximately located points in the visualization of the embeddings (illustrated as circular outlines around points of the visualization in FIG. 1). Thus, system 100 implements network embeddings in order to provide insight on interactions that may typically occur within a similar context on LAN 101, which in turn provides context-rich information for purposes of network security.

In some embodiments, the system 100 can perform interactive device clustering using hierarchical distance as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. For example, the visualization interface 152 may present a graph which represents client devices 110A-110N on LAN 101 that are measured as having small distances from each other, as determined by the distance algorithm, as a cluster of nodes. Alternatively, the graph displayed within visualization interface 152 can show client devices 110A-110N on LAN 101 that are measured as having large distances from each other, as determined by the distance algorithm, as individual nodes separated by edges (having a length that is commensurate with the calculated distance).

Referring now to FIG. 3A, an example of a transactions log 300 is shown. As seen in FIG. 3A, the transaction log 300 can include multiple records of servers accessed within a communications network. A corpus may be generated from the transactions log 300, in accordance with the network embeddings techniques disclosed herein. As previously described, a corpus can be crafted to include formulated text or sequences based on the semantics intended to be captured. In some embodiments, generating a corpus (e.g., crafted corpus) includes tags, headings (e.g., column headings in spreadsheets), column names (e.g., from databases), and the like, as information to extract useful semantics. Furthermore, the tags of a corpus can be leveraged to formulate coherent sentences that binds various columns with right link words. An example of a binding between tags in a corpus is shown in FIG. 4D.

In the example shown, transactions log 300 includes several entries 303, where each entry is a record of a transaction (e.g., activity within a computer network). As shown, transactions log 300 includes lists of data 302a-302d that are organized into several different categories, including: "ServerName" 350; "DatabaseName" 351; "LogsGenerated" 352; "DurationInSeconds" 353; "Usernames" 354; and "TimeStamp" 355. Data 302a-302d, for example, contained in the transactions log 300 can be used to create a crafted corpus, as will be explained in more detail below. In the illustrated example, the transactions log 300 includes a list of network assets, shown as "ServerName" 350. The "ServerName" 350 category be a list of servers which have been requested to perform tasks in a certain network. Also, transactions log 300 is shown to include a list of database names, shown as "DatabaseName" 351. The "DatabaseName" 351 category can include a list of databases that are accessed by users, where the particular users are listed under "UserNames" 354. Remaining categories shown include "LogGenerated" 352 listing the number of logs generated, the "DurationInSeconds" 353 which lists a duration of a session (in seconds) when the servers were accessed, and "TimeStamp" 355 listing the timestamps for each entry.

Subsequently, the network embeddings techniques disclosed herein can extract network activity data from available sources, such as data 302a-302d from transactions log 300, in order to generate a crafted corpus. In an example, a user associated with user name "User A" may be an employee in the finances department, and accesses a server "ex-08-07" that is assigned to a subset of the financial department, while working on January 14 at 9:01:23 AM. Accordingly, entry 303 is an example of a record in the transaction log 300 that may be generated based on that network activity associated with "User A." The entry 303 lists the user, the server accessed by the user, the duration, and time stamp that is associated with that interaction. In some instances, the entry 303 (i.e., "User A" accesses server "ex-08-07") may reflect the type of network activity that is typical behavior in the context of "User A." Accordingly, an analyzer (shown in FIG. 1) implementing network embeddings techniques can formulate a type of crafted corpus that ties a user with a sequence of servers that each user accessed.

Figure 3B:
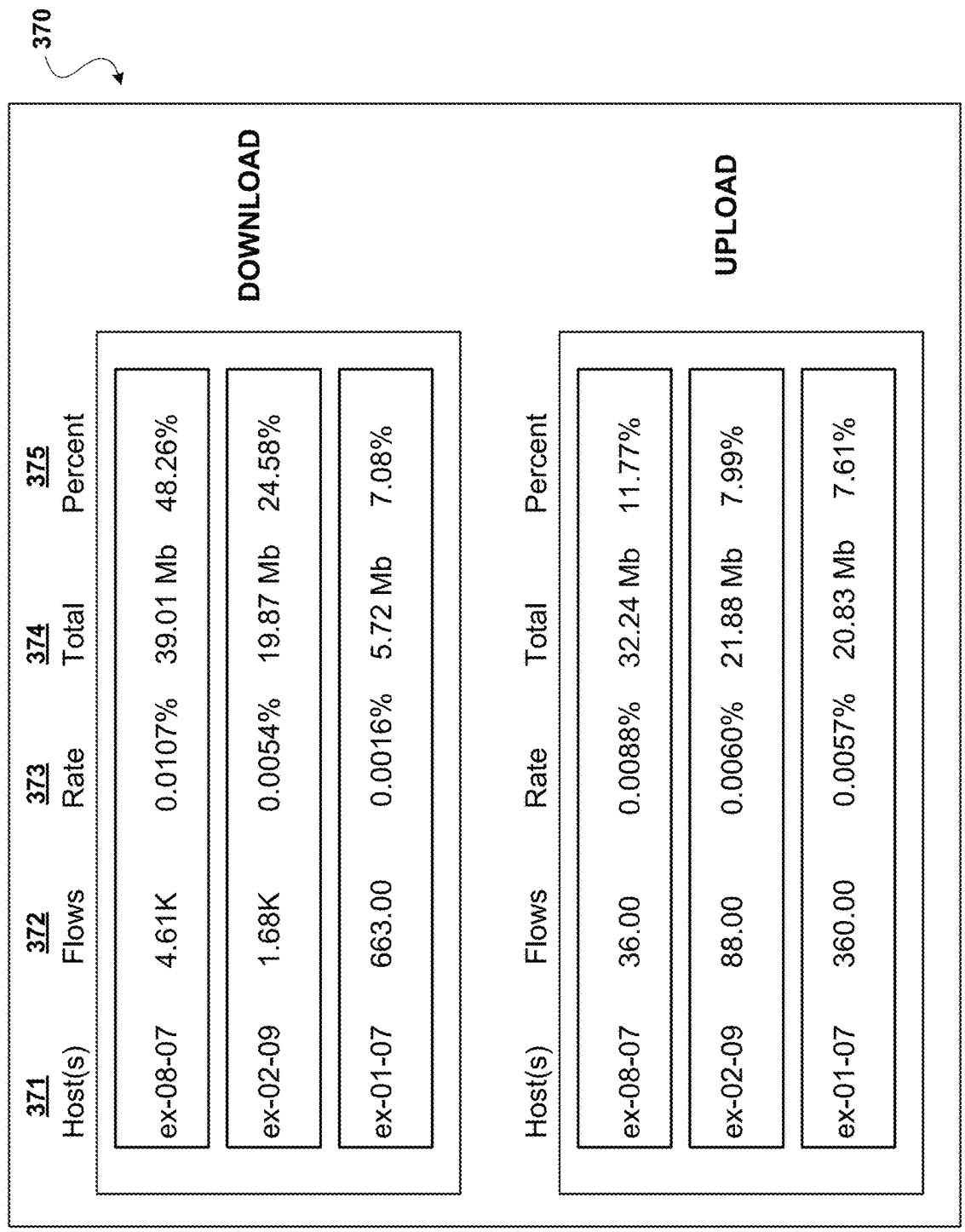
FIG. 3B illustrates an example of a flow log including records relating to network activity in the communications network shown in FIG. 1, according to some embodiments.
Figure 4D:
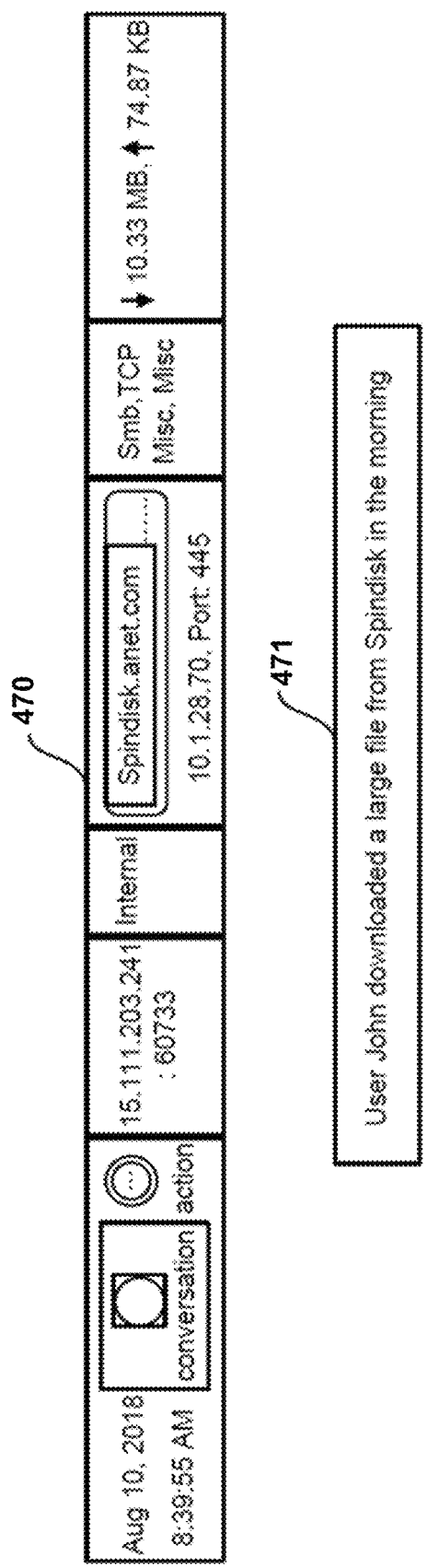
FIG. 4D illustrates an example of an entry of a corpus which has undergone regularization, according to some embodiments.

FIG. 3B is another example of a log that may be utilized in accordance with the disclosed network embeddings techniques, namely a flow log 370. The flow log 370 is an example of a report that can be typically produced by network analytics applications, such as NetFlow. The flow log 370 is shown to includes several entries corresponding to a record of transactions (e.g., activity within a computer network) similar to the abovementioned transaction log. In contrast to the example transaction log (shown in FIG. 3A), the flow log 370 also categorizes the interactions for particular host as uploads, indicating the amount of bytes involves in data transfer, and downloads, indicating the amount of bytes related to each interaction. As shown, transactions log 370 includes lists of data that are organized into several different categories, including: "Host" 371; "Flows" 351; "Rate" 352; "Total" 374; "Percent" 375. Thus, a flow log 370 can provide network behavioral context associated with upload and download bytes involved in the interactions that are logged. For instance, flow log 370 can display the top 3 hosts for a time period based on total amount of traffic sent or received for the network. In the example, the flow log 370 indicates that the server "ex-08-07" is associated with the largest transfer of data (with respect to bytes and percentage) for both downloaded and uploaded information. The flow log 370 shows server having download at "39.01 Mb and "48.26%" and upload at "32.24 Mb" and "11.77%". Accordingly, network behavior indicated by the flow log 370, including transacted bytes in outbound (upload) and inbound (download) interactions, can then be captured word embeddings.

As previously described, a corpus of "words" from "sentences" relating to network activity can be particularly crafted based on the entities intended to be captured in a unified embeddings space. In FIGS. 4A-4C, examples of crafted corpuses that may be generated using the network embeddings techniques are illustrated. FIG. 4A shows an example of a crafted corpus 400 of sequences of servers 410 that are grouped for a particular user. As previously described, the disclosed network embeddings techniques can be used to generate a "server sequence" category of crafted corpus which specifically captures a sequence of server interactions that are grouped per user, per session. In the example, the crafted corpus 400 is structured for capturing server interactions involving "UserA" 405. As seen, the crafted corpus 400 includes a sequence of servers 410 that have been determined to be accessed by "UserA" 405 (based on NLP-driven analysis of transactions record shown in FIG. 3A). The sequence of servers 410 grouped to "UserA" 405 in the crafted corpus 400 includes servers named "Server ex-08-07", "Server ex-02-09", and "Server ex-10-07." FIG. 4A also illustrates an example of a semantic relationship 420 that can be understood from network embeddings derived from the crafted corpus 400, which can be analogous to word embedding derived from semantics of a sentence in natural language. The semantic relationship 200 groups interactions with servers "Server ex-08-07", "Server ex-02-09", and "Server ex-10-07" to the network activity of "UserA."

Referring back to the example discussed in reference to FIG. 1, "UserA" 405 may operate a computer assigned to the financial department, and the servers in sequence 410 ("Server ex-08-07", "Server ex-02-09", and "Server ex-10-07) may be within the subnet utilized by the financial department to specifically support financial applications. In capturing the sequence of servers 410 that have been accessed by "UserA" 405 in the crafted corpus 400, and modeling this over time, the embeddings space may represent a group of servers that "UserA" 405 typically interacts with during his (or her) normal activity in the context of the financial departmental workflow. As an example of a visualization, the crafted corpus 400 may yield an embeddings space that represents network activity for "UserA" 405 in a multidimensional space that is then visualized in a reduce dimensional space, like a 2D or 3D space (using various techniques that are standard for embedding visualization in NLP). Based on the relation represented in the visualization, cohesiveness (or contextual relationships) between network entities can be presented visually. For instance, a network embedding relating to the example can be visualized where the sequence of servers 410 are grouped together in closed proximity, indicating that these servers are common interactions with respect to the specific user, namely "UserA" 405. Consequently, the network embeddings techniques can use crafted corpus 400 in a manner that allows a network security application to discern between interactions with certain servers that are contextually similar with respect to a user, or interactions with servers that may be dissimilar, or anomalous, for a user as captured in the unified embedding space.

In FIG. 4B, an example of a crafted corpus 430 in a "user sequence" category is shown. The network embeddings techniques can involve structuring a crafted corpus to specifically include a sequence of users that are grouped for a particular server, and over a time period of a day, thereby including a sequence of all of the users who access a specific server on a given day. Accordingly, a crafted corpus in the "user sequence" category, such as crafted corpus 430, can capture an embedding space of users with common workflow, along with temporal proximity (e.g., within the same day). In the example of FIG. 4B, the crafted corpus 430 is structured for capturing interactions that involve a certain server 435, shown as "Server ex-08-07" 405. As seen, the crafted corpus 430 includes a sequence of users 440 that have accessed the server "Server ex-08-07" 435 during a day. In some instances, a day is a full calendar day, or alternatively a span of 24 hours (e.g., 9:00 AM Monday until 9:00 AM Tuesday). The sequence of users 440 in the crafted corpus 430 groups together users, namely "UserA" and "UserD", whom have been determined to have the relationship of both accessing a common server 435 around the same time (based on NLP-driven analysis of transactions record shown in FIG. 3A). Additionally, FIG. 4B illustrates an example of a semantic relationship 450 that can be understood from network embeddings derived from the crafted corpus 430. The semantic relationship 450 groups together a sequence of users, shown as "UserA" and "UserD" having contextually similar interactions with server 435 "Server ex-08-07." Network embeddings techniques can be applied to a "user sequence" crafted corpus, such as crafted corpus 430, and over time, form an embedding space that represents the groups of users that similarly access the same server, and having an attribute of temporal proximity. As a result, this type of crafted corpus can allow a network security application to determine that a server, for instance server 435 ""Server ex-08-07", being accessed by a group of users tends to occur in similar context. This capability to distinguish which users have a common workflow (and typically access the same server), can be compared to having awareness of which users have authorization and/or access permissions to a particular network asset, and then detecting that another user accessing the server outside of this common workflow may be anomalous (e.g., with respect to the users captured in the unified embedding space).

In FIG. 4C, an example of a crafted corpus 450 in a "sequence of user groups/server groups" category is shown. The network embeddings techniques can involve structuring a crafted corpus to specifically to capture an embedding space to visualize the dimensionality of groups of users that access groups of servers. In the example of FIG. 4C, the crafted corpus 460 can be generally described as the combination of the "sequence of servers" crafted in FIG. 4A and the "sequence of users" crafted corpus shown in FIG. 4B. The crafted corpus 460 is structured and includes content similar to that of the crafted corpuses discussed in detail in reference to FIGS. 4A-4B above, and thus will not be discussed again for purposes in brevity. In addition to the crafted corpus 460, the network embeddings techniques can use transaction records (or flow records) that are expressed in natural language to develop an embedding space.

Additionally, the example in FIG. 4C shows that the crafted corpus 460 can be partially regularized. In particular, crafted corpus 460 includes an encoded time element 465. Generally, the encoded time element 465 is indicative of time related to the interaction, such a timestamp, which is further encoded in human terms (natural language). The encoded terms that can be used for encoded time element 465 are descriptively representative of a time of day for a language, such as "morning", "evening", and the like. Each transaction record, in FIG. 4, has an encoded time element 465 of "Morning", indicating that all of the captured network activity in the example crafted corpus 460 occurred in the morning. It should be appreciated that the encoded element 465 can utilize other types of descriptive terms that can provide temporal-based contextual value to a crafted corpus 460, as deemed appropriate. As an example, the terms used can be a configurable feature of the disclosed network imbedding techniques, allowing a user, such as network administrator to set the terms used for the encoded time element 465 as appropriate for a particular application (e.g., broader terms that can capture neighboring time ranges without explicit configuration). Example of natural language terms, also referred to as encoded terms, that may be used for the encoded time element 465 include, but are not limited to: time of day (e.g., "Morning", "Afternoon", etc.); a day of week (e.g., "Monday", "Weekday", etc.); a month ("May", etc.); and portions of a time of day (e.g., "early morning", "mid-morning", etc.). An example of a transaction record that has been further regularized and can be used with crafted corpus 460 is shown in FIG. 4D.

It should be appreciated that a corpus is not limited to a transactions log and that a crafted corpus is not limited to a list of server names and duration times that each task was performed. In some implementations, a corpus may include a network flow record expressed with some regularization methods. In some implementations, a network administrator can perform regularization to configure or reconfigure a corpus or crafted encoded corpus to influence the input. For example, a regularization method may include a specific time range or data, expressed in, for example an UTC time format can be represented as time of day (e.g., morning or evening) using time zone with respect to the deployment location instead of network administrator location. Another example would be to compare the sent and received bytes or use the PCR (Producer-Consumer ratio) and convert to terms like download or upload. Moreover, regularization can modify or enhance raw data in the crafted corpus to human interpretable terms. In addition, a crafted corpus may be constructed based on configured defaults or by a network administrator (e.g., high-tier network administrator).

FIG. 4D is an example of one entry 470 of a corpus (not shown) which has undergone regularization (e.g., regularized corpus entry 471). As shown, corpus entry 470 includes information associated with a particular network activity. Corpus entry 470 includes a timestamp of a downloaded file from a particular server on a particular network client (e.g., desktop computer). As discussed herein, one or more regularization methods may be applied to the corpus entry 470 to create a regularized corpus entry 471. According to the example shown, regularized corpus entry 471 states: "User John downloaded a large file from Spindisk in the morning" or "User 523 downloaded a large file from Server 9785 in the morning". As alluded to above, this type of regularization is based on underlying "bindings" that can be made in a corpus, by leveraging tags to formulate coherent sentences that binds various columns with linked words. In other words, regularization can be based on the column names that categorizes the information in that column, such as column names that categorizes the information in that column.

Figure 5:
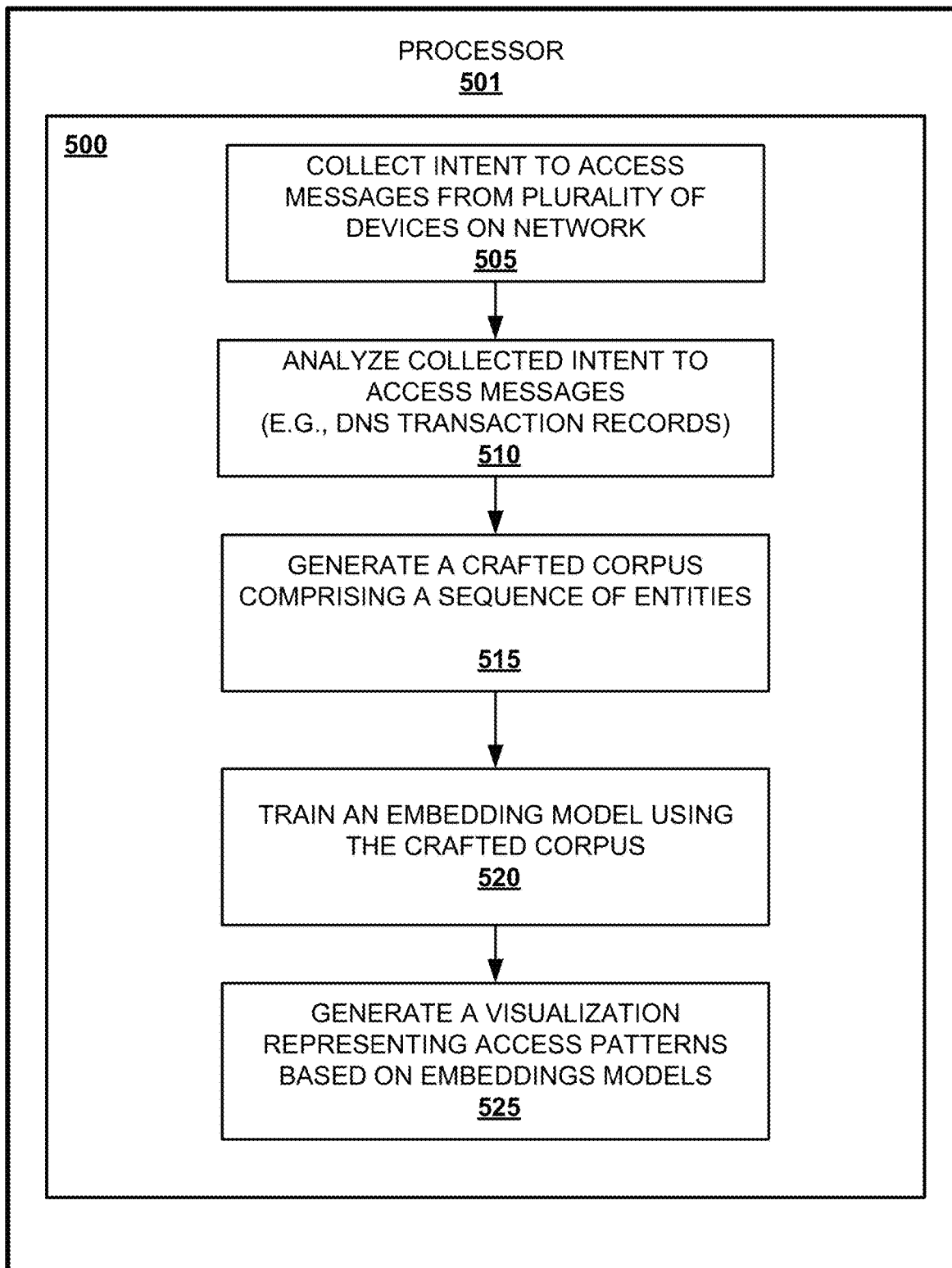
FIG. 5 is an operation flow diagram illustrating an example of a process for executing network analytics using network embeddings modeling, according to some embodiments.

Referring now to FIG. 5, an operation flow diagram illustrating an example of a process for executing network analytics using the disclosed network embeddings is shown. Process 500 is illustrated as a series of executable operations performed by processor 501, which can be the analyzer (shown in FIG. 1), as described above. Processor 501 executes the operations of process 500, thereby implementing the disclosed network embedding techniques described herein.

The process can begin at operation 505 wherein transaction logs of network interactions are received. For instance, a plurality of transaction records (comprising a transaction log) associated with specific network interactions between entities in a communication network, are received by a network analyzer (shown in FIG. 1). Examples of transaction logs (including information that is indicative of network activity) that can be collected at operation 505 are shown and described above in reference to FIG. 3A. Also, in some embodiments, operation 505 can include collecting flow records, such as flow records including DPI information.

Examples of flow records that can be collected at operation 505 are shown and described above in reference to FIG. 3B. Moreover, although process 500 is described in relation to transaction logs and flow records, it should be appreciated that network embeddings can be applied to other types of data that may be high in information content about the network. For instance, NLP-based approaches, namely network embeddings, can be applied to various types of packets, records, or messages, that enable devices on a network to announce information related to its configurability (e.g., services and associated parameters) and accessibility in a manner that allows the devices to discover, connect, and communicate with each other on the network. In some embodiments, network embeddings approaches can be applied to discovery protocol traffic (and intent to access messages). As an example, metadata from collected packets that may be present in discovery protocol traffic can be analyzed using NLP, such that the information can be used to derive network analytics. Discovery protocols consistent with the present disclosure may include a dynamic host configuration protocol (DHCP), a domain name service (DNS), a multicast DNS (mDNS) protocol, a link layer discovery (LLDP) protocol, a CISCO discovery protocol (CDP), and many more that are low in volume, but high in information content about the network. Applying text-based analysis, namely NLP, to network traffic that has high informational content about the network and the devices thereon, such as discovery protocol messages, is an underlying concept for NLP-driven network analytics. Furthermore, applying network embeddings to discovery protocol traffic can be an optimization in data collection, compute and storage. In contrast, generating network embeddings from transaction logs and network flows, as described, can be a straightforward approach (e.g., less complexity in collecting and analysis) which can produce high accuracy results. Thus, the particular type of collected data from the network that is utilized for the network embeddings process 500 may be a design trade-off on the cost of solution for higher complexity.

Additionally, embodiments can include mechanisms for passively collecting and analyzing discovery traffic. For example, the network analytics system disclosed herein can leverage edge devices to listen to discovery protocol traffic within the network, allowing network interactions to be collected in a manner that is passive (e.g., listening, intercepting). Using passive data collection to drive network embeddings can provide advantages over some existing network analytics systems, which employ mechanisms that inject additional traffic into the network that is solely for the purpose of analysis. Additionally, the system provides a minimal footprint by deploying fewer packet processing devices at strategic points in the network architecture (e.g., edge devices). The process 500 can include applying NLP-driven techniques to discovery protocol traffic (or intent to access messages) in network interactions (e.g., during device discovery and/or advertisement) for network analytics as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety.

Next, the process 500 can continue to operation 510. At operation 510, a crafted corpus can be generated based on a selected corpus category. Thus, operation 510 can produce a crafted corpus (in response to the selected corpus category) that is aligned with the type of access semantics to be captured by an embedding, thereby being generally formed on a per-user, per-server, or per-server group basis. As alluded to above, network embeddings techniques can include formulating a crafted corpus that is structured in accordance with one of three principal categories, including: 1) a crafted corpus of servers, per user (e.g., per session); 2) a crafted corpus of users, per server (e.g., per day); and 3) a crafted corpus of a group of users, per group of servers accessed (where the same corpus can also have sequence of the source IP of the devices from which the access were made to a server, grouped by the server). Although the aforementioned categories are described in detail for purposes of illustration, it should be appreciated that other categories for a crafted corpus can be implemented at operation 510. As an example, some embodiments can generate a crafted corpus including a sequence of the source IPs of the network devices from which the accesses were made to a server, grouped by the user. In some instances, the corpus category can be selected in response to user input. For example, a network administrator interacting with a visualization interface provided by the network analyzer system (shown in FIG. 1) can select a corpus category of servers, per user. Accordingly, continuing with the example, operation 510 can particularly craft the corpus based on the selected corpus category, and generated the crafted corpus to include a sequence of servers.

Furthermore, operation 510 can involve various NLP techniques, such as extracting text from the transaction logs received in operation 505, and then applying text-based analysis. In some cases, the plurality of transaction logs can be analyzed using NLP-driven approaches in order to identify the network entities associated with a particular interaction from the information in the transaction records. In other words, operation 510 involves discerning unique parameters in transaction records as text strings that can be further analyzed to distinctly identify various network entities such as users, servers, devices, and the like, as deemed appropriate for analyzing network activity.

Referring back to the example of the selected crafted corpus being a sequence of servers grouped per user, operation 510 can involve additional aspects to formulate the designated crafted corpus. In order to generate the crafted corpus of the selected corpus category, a subset of transaction records within a specified time period may be analyzed. The subset of transaction can be specifically analyzed in order to identify users associated with each of the network interactions. Then, the records in the subset that are associated with an identified user are further analyzed. This analysis can involve identifying a sequence of servers for the particularly identified user. As an example, the subset of transaction records can be analyzed for each user, where the servers that are accessed by each user may be identified as text strings within the transaction records (corresponding to a respective user). Accordingly, the crafted corpus generated in operation 505 can include a sequence of servers by grouping the servers extracted from the subset of transaction records for the identified user. In some cases, the time period applied for generating a crafted corpus to include a sequence of servers grouped per user, can be at least one of: a session for the identified user; a day; the time between an identified log-on and a corresponding log-off event for the identified user (e.g., indicative of a session); or the time between an identified request and a corresponding release event for the identified user. In some instance, log-on and log-off could be inferred through data fusion/augmentation techniques that correlate users based on AD logs or other authentication logs. Also, the abovementioned request and release events can be inferred based on DHCP request and release events. In other cases, network log-on and log-off events may be logged by network devices.

Additionally, in some cases, operation 510 can further involve formulating the crafted corpus from analyzed transaction records in a manner that is indicative of micro-patterns (e.g., having temporal proximity) for a user. Restated, network interactions for a user may be further grouped within separate contexts based on temporal proximity, even within the specified time period. For instance, operation 510 can be configured to determine a substantial time lapse between groups of transaction records (within the subset of transaction records) for an individual user. As an example a first group of network interactions for a user may occur closely together (e.g., within an hour, with respect to temporal proximity), and then more than 5 hours later within the same day, the user may initiate another group of network interactions that also occur closely together. According to this example, the groups of servers in the crafted corpus can be further separated into a first group of servers (e.g., morning) and a second group of servers (e.g., evening) in a manner indicating that the network interactions corresponding to the first group of servers and the network interactions corresponding to the second group of servers are separate activity patterns for the identified user. For instance, the crafted corpus can be formulated to represent that a user has a first access pattern that typically includes accessing a first group of servers in the morning, and then another access pattern that typically includes accessing a second group of servers in the evening. In some cases, determining a time lapse can indicate that the groups of servers for the respective groups of transaction records are unrelated for the identified user.

In another example, the selected corpus category can be a sequence of users grouped per server. In this scenario, operation 510 can involve additional aspects to generate the crafted corpus in a manner that may represent common workflows (e.g., departmental workflows), including users that are grouped per server. Accordingly, operation 510 can analyze a subset of transaction records relating to interactions that have occurred within a specified time period, such as a day. The subset of transaction records can be specifically analyzed in order to identify servers associated with each of the network interactions. Thereafter, transaction records associated with each identified server in the subset are further analyzed; identifying a sequence of users as text strings within the subset of transaction records corresponding to interactions per each identified server. As a result, the crafted corpus generated in operation 505 can include a sequence of users by grouping the users extracted from the subset of transaction records for each of the identified servers.

In yet another example, the selected corpus category can be a sequence of users grouped per a group of servers. In this scenario, the additional aspects of operation 510 to generate this category can be generally described as a combination of the operations to generate both categories of crafted corpuses as previously described. That is, generating the crafted corpus at operation 510 can include grouping users extracted from a subset of transaction records for an identified group of servers. Thus, a crafted corpus generated in this manner, which includes servers grouped by users and source users grouped by servers, will provide user and server behavior (embeddings of two discrete entities) in a single embedding space showing cohesiveness within entities but not across them.

In some cases, operation 510 can include regularizing transactions records, such as the subset of transaction records related to a particular user (within a specified time period). Regularization can be used to capture semantic meanings, as discussed in detail above in reference to FIG. 4D. In some cases, regularization involves replacing at least one parameter in a transaction record with a corresponding encoded term that has been determined to represent that parameter using natural language terminology. For example, a timestamp of "9:00 am" may be replaced with a designated encoded term of "morning", determined to characterize that time related parameter using terminology that has an understood meaning (e.g., interpretable to a human). Then, the crafted corpus can be formulated using the regularized subset of transaction records, where these transaction records having at least one parameter that has been replaced, or encoded, with the corresponding encoded term. Thus, as a result of the regularization, a crafted corpus can be formulated in a manner that represents the corresponding network interactions using natural language terminology. As such, operation 510 can produce a crafted corpus which is also referred to herein as a crafted encoded corpus, which generally can make the sequences in the corpuses more comprehensible (e.g., to human interpretation). Also, generating a crafted encoded corpus may, in some instances, reduce extraneous data that is not necessary for ultimately generating the network embeddings.

Next, process 500 can proceed to operation 515 to generate network embeddings model based on the crafted corpus. In some cases, operation 515 applied word embedding techniques to the crafted corpus, so as to generate the network embeddings. Nonetheless, the process 500 is not intended to be limited to word embeddings, and other semantic learning approaches used in NLP, such as character embeddings and sentence embeddings, can be implemented at operation 515 in order to generate network embeddings model.

Using word embeddings of the crafted corpus, for example, operation 515 can result in an network embeddings model. Generally, an embeddings model includes a vector space of text that captures contextual similarities of text strings. Accordingly, a network embeddings model representing network interactions as a vector space of text, can be used to measure similarities between the interactions of the network entities captured in the embedding space. Furthermore, the network embeddings model can indicate access patterns derived from the contextual similarities of the interactions captured in the embeddings space. Thus, the vector representations included in the network embeddings can be used to correlate to the "distance" (e.g., proximity) between entities listed in the crafted corpus. For instance, a network embeddings model generated from a crafted corpus of a sequence of servers, can indicate which sequence of servers are commonly requested by a certain user within a certain timeframe. In some cases, a network embeddings model from the crafted corpus formulated in accordance with the abovementioned corpus categories may define a vector space for servers and another vector space for users. Network embeddings from the crafted corpus of a sequence of users may define a vector space for users and another vector space for servers. In the case of a sequence of users grouped per a group of servers, the network embeddings model allows a relationship to be derived between the sequence of users and the group of servers within the group of servers and within the sequence of users.

In some cases, operation 515 can involve extracting each text string within the crafted corpus, and generating a vector representation of network entities within the crafted corpus, based on the extracted text string, where each vector represents semantics of the network entities. Thereafter, the vector space can be used for capturing contextual similarities between the network entities and similarities between the network interactions of the similar network entities over time. Consequently, the generated network embeddings model effectively derives access patterns for the network entities in the vector space.

Then, at operation 520, a network security system can be trained using the network embeddings model to perform certain network security and/or network analysis functions. In the example process 500, operation 520 involves training a network security system, based on the network embeddings model, to detect network anomalies. As such, operation 520 can include training the network security system to capture existing behavior of a communication network vis-à-vis the network activity represented in the network embeddings model. Furthermore, the training in operation 520 can involve capturing this typical network behavior, as it pertains to a particular user (or group of users), or particular server (or group of servers), over time. In other words, the system can be trained to analyze network embeddings in order to observe frequently occurring network activity, or regularly observed patterns in network activity, as nominal behavior in the network. Conversely, training 520 allows the system to analyze a network embeddings model and identify deviations to identified trends in network activity. As a result, the system can be trained to operation 520 to detect activity that may be anomalous. In some implementations, training in operation 520 includes training based on machine learning techniques. For example, training employing a machine learning approach can be implemented using the network embeddings model as data sets. In some cases, multiple crafted corpuses and/or network embeddings models may be employed during the training of operation 520. Therefore, a network security system can be trained, and retrained, using a combined dimensional space. Additionally, crafted corpuses and/or network embeddings models relating to multiple communication networks may be used during training at operation 520. Accordingly, the network security system can monitor a several different network in accordance with the network embeddings techniques disclosed herein. In accordance with some embodiments, operation 520 also includes training the system to differentiate between anomalies and simple outliers.

Next, at step 525, a visualization can be generated representing the network embedding model in a reduced space. For example, operation 525 can involve translating the network embeddings model, which is in a multidimensional space, into a visualization that is generated in a 2D or 3D space, using a NLP-driven visualization technique. For instance, the multidimensional visual representation can be reduced through various modeling mechanisms (applying mathematical techniques), such as Principal Component Analysis (PCA), t-SNE or Uniform Manifold Approximation and Projection (UMAP). The visualization can include graphical representations of the access patterns corresponding to the network entities in the communications network that are captured in the embeddings space. The visualization can also indicate proximities between network entities, which relates to the measured similarities captured by the embeddings model. As an example, a visualization can place visual cues that represent servers (e.g., sharing contextually related network interactions, such as being access by the same user) at close physical distance, such as within a circle.

In that example, the circle generated by the visualization is a visual representation of a group of servers in the embeddings space.

According to some embodiments, the visualization generated at operation 525 can be further applied in performing network security and/or network analysis functions. For example, the visualization of a network embeddings model representing network activity (e.g., access patterns of the network entities within a network) can be analyzed to detect suspicious access patterns, such as a user accessing a server that is outside of a group of servers captured in its interactions within the vector space. In response to detecting a suspicious access pattern or an anomalous access pattern, the visualization can be updated. Some examples of updating the visualization can include: updating the visualization to include interactive elements configured to receive user input; updating the visualization to indicate outliers based on received user input indicating the outliers from suspicious access patterns; updating the visualization to remove outliers; updating the visualization to produce an alert; updating the visualization to include indications of incidents of interest; updating the visualization to include indications relating to deviation in the network embeddings model. Therefore, visualizations of network embeddings can mitigate false positives pertaining to network security (e.g., identify simple outliers), and can to improve the overall accuracy of detecting anomalous network behavior by using network embeddings. Also, in some cases, the visualization can be applied in training the network security system, as described relating to operation 520. Various examples of visualizations that may be presented to a user, in accordance with the embodiments, are depicted in FIGS. 6A-6D.

Now referring to FIGS. 6A-6C, examples of visualizations that can be generated as a result of the hierarchal distance techniques as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety.

Figure 6D:
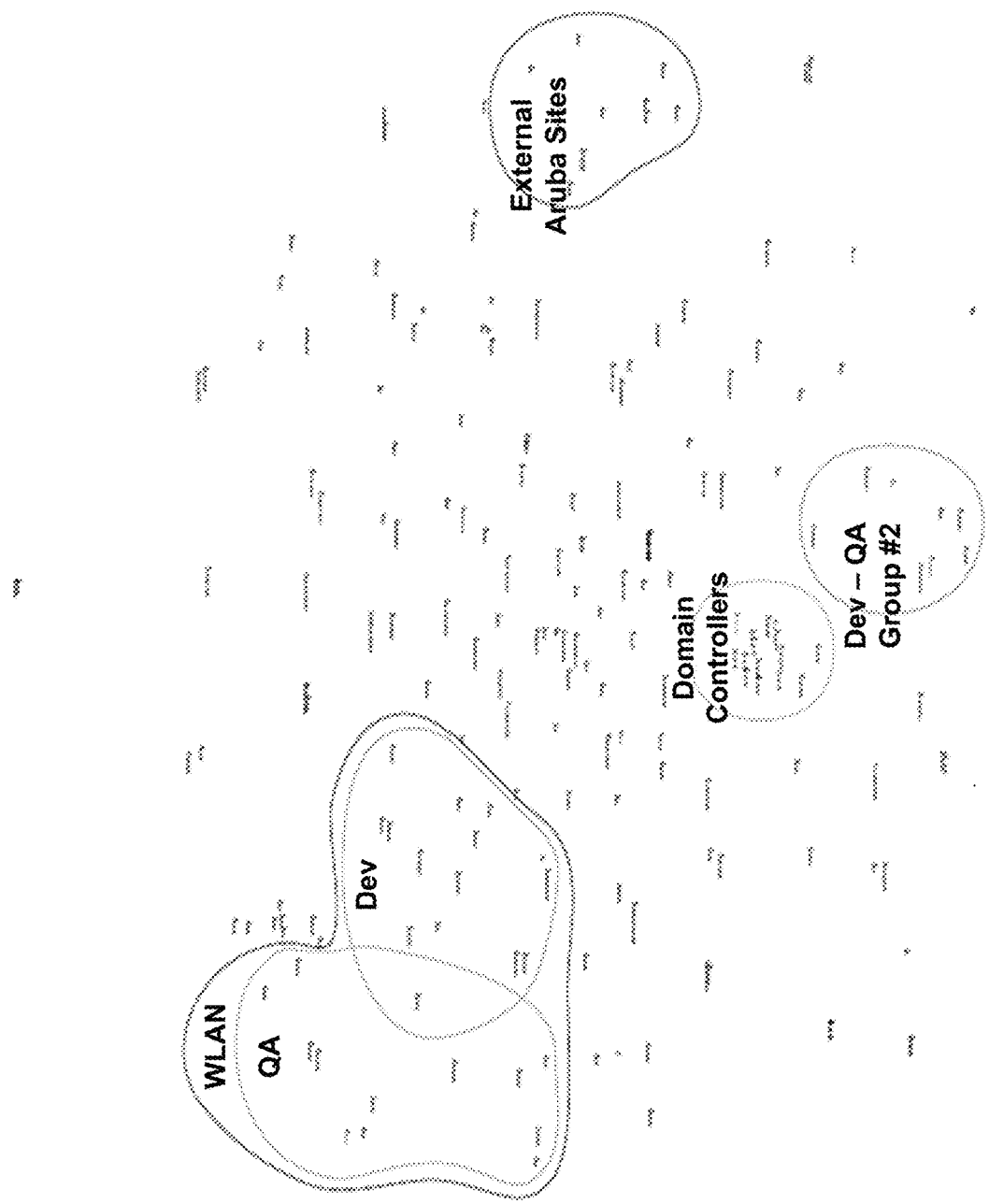
FIG. 6D depicts a semantic visualization map of a crafted corpus of network activity generated using visualization aspects of the network analytics system disclosed herein, according to some embodiments.

FIG. 6D is an example of a visualization 800 for a crafted corpus that may be generated in accordance with the disclosed techniques. For instance, the visualization 800 includes an embeddings space that represents network activity (captured in a multidimensional space by the network embeddings mode) in a reduce dimensional space. Based on the relation represented in the visualization, cohesiveness (or contextual relationships) between network entities can be presented visually.

In the illustrated example, the visualization 800 (also referred to herein as a semantic visualization map) is generated using a t-SNE visualization technique. The t-SNE technique may comprise two main stages. First, t-SNE may construct a probability distribution over pairs of high-dimensional objects in such a way that similar objects have a great probability of being picked while dissimilar points have an extremely low probability of being picked. Secondly, t-SNE may define a similar probability distribution over the points in the low-dimensional map, and it may minimize the Kullback-Leibler divergence between the two distributions with respect to the locations of the points in the map.

In the example shown, the semantic visualization map 800 includes a plurality of icons for network assets (e.g., icons 806, 807, 809, 810) within a network system. Herein, a semantic visualization map is defined as a map of network assets that are arranged in a manner that reveals how often the network assets are associated with each other. For example, icons for network assets that are within a cluster (e.g., clusters 801-805) reflect that the icons for network assets therein were listed in the transactions log proximate to each other. For example, icon 806 for a network asset and icon 809 for a network asset are both within cluster 801 which indicates that they may be accessed by network users within a short time frame from each. For instance, when the icon 806 for a network asset (e.g., network server) is accessed, the icon 809 for a network asset (e.g., network printer) is generally accessed shortly thereafter.

In some cases, semantic visualization map 800 may display a cluster 808 with two or more clusters (e.g., clusters 801, 802) therein. Furthermore, there may be icons 807 for the network assets that are in two or more clusters 801, 802. Accordingly, a crafted encoded corpus (e.g., information from a transactions log) may reveal that there may be sub-groups of network assets that are requested to perform tasks in sequence with each other or closely before or after each other. Icon 810 for a network asset illustrates that there may be several network assets within a network system which may perform tasks independently of other network assets such that a transactions log would not show a sequence or trend of requests from the icon 810 for a network asset associated with any other network asset on the network system.

Additionally, in some cases, a security threat is identified if a sequence of network assets is assessed in a manner that is inconsistent with the cluster of network assets that the sequence of network assets is associated with. For example, if a user accesses a sequence of network assets illustrated within one cluster (e.g., cluster 802) and then accesses a sequence of network assets illustrated within another cluster (e.g., cluster 804) in a manner that is atypical with respect to historical data, an alert may be generated and sent to a network administrator.

In yet another case, the semantic visualization map 800 may be deployed to illustrate the relationship between users according to the network assets that they have accessed. For example, the clusters (e.g., clusters 801-805) illustrated may represent the users that access the same network assets. For instance, the users within cluster 801 may access the same network assets whereas the users within cluster 803 may access the same network assets. For example, a network security software application provided herein may determine that there may be a security threat if a user within one cluster (e.g., cluster 801) is accessing network assets in a sequence that are associated with users classified within another cluster (e.g., cluster 803). If a security threat is identified, an alert may be generated and sent to a network administrator.

Cluster 805 also includes an icon 811 for a network asset which is substantially larger than the other icons for network assets displayed on the semantic visualization map 800. The increased size of icon 811 may indicate that the representative network asset is associated with a higher frequency representation of the network asset within a corpus (or crafted encoded corpus). For example, the size of each icon for a network asset may be indicative of the frequency representation of a respective network asset within a corpus.

In addition, the employment of network embeddings may be accomplished using skip-gram, Bag-of-Words model, GloVe and any other embeddings model according to the volume of data available. In other implementations, an embeddings model could also employ hyper-parameters from multiple levels of deep neural networks such as, but not limited to, an Embeddings for Language Models (ELMo)

model, a Bi-directional Language Model (BiLM), and a Bi-directional Encoder Representation (BERT) model. In addition, an embeddings model can be employed to capture semantics of polysemous words by employing an attention-based approach. In some implementations, an embeddings model can be employed for security applications, particularly with a corpus that includes a sequence of destinations with the authentication servers.

Figure 7:
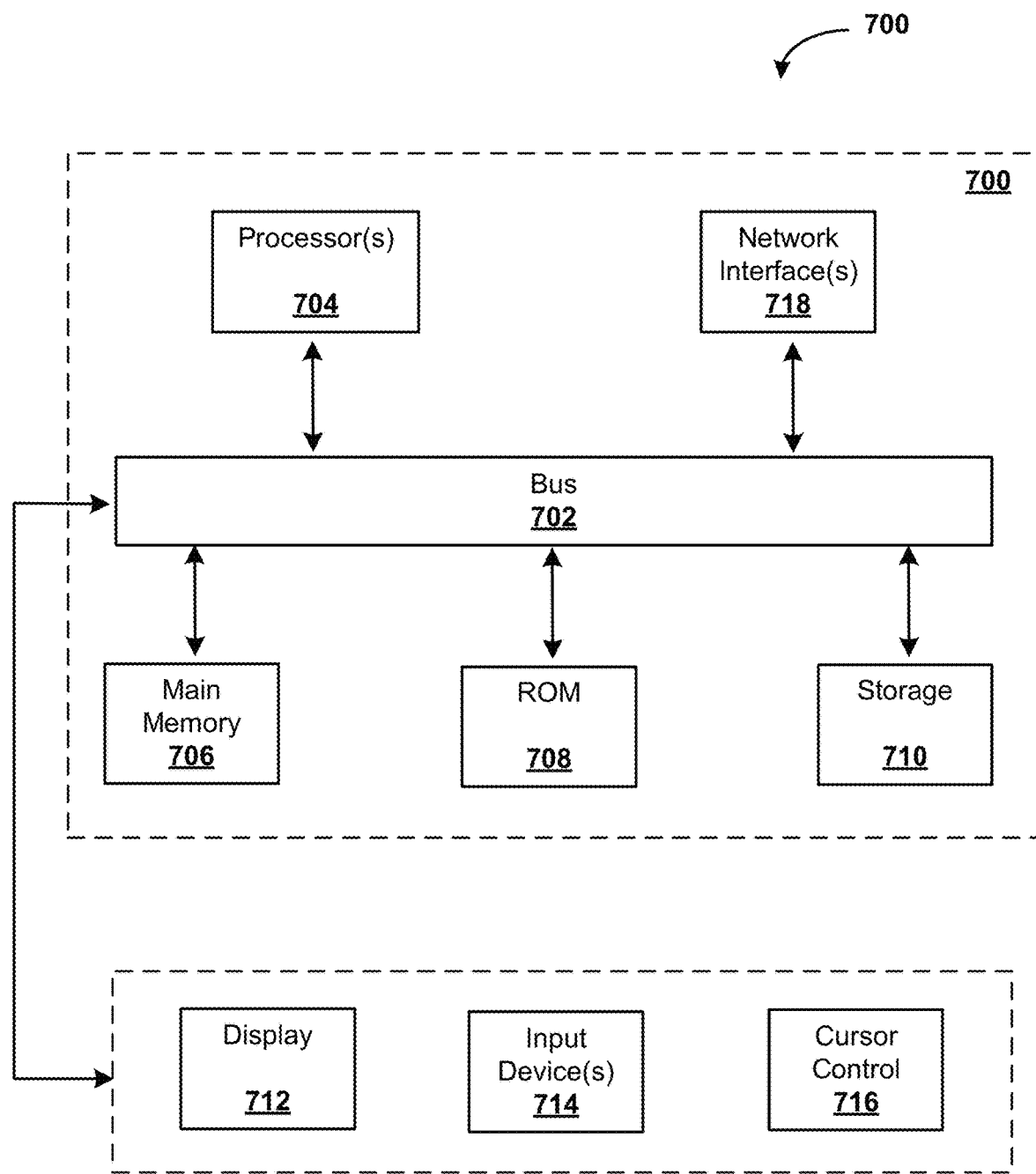
FIG. 7 illustrates an example computing device that may be used in implementing various network analytics using embeddings modeling features relating to the embodiments of the disclosed technology.

FIG. 7 depicts a block diagram of an example computer system 700 in which may be used in implementing various such-network analytics functions using network embeddings relating to the embodiments of the disclosed technology. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 708, such as a random-access memory (RAM), cache and/or other dynamic storage devices, coupled to bus 702 for storing information and instructions to be executed by processor 704. Main memory 708 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes storage devices 710 such as a read only memory (ROM) or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 708. Such instructions may be read into main memory 708 from another storage medium, such as storage device 710. Execution of the sequences of instructions contained in main memory 708 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 508. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated service digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for analyzing access patterns within a communication network, comprising:

receiving, by a network device, a plurality of transaction records associated with network interactions amongst a plurality of network entities in the communication network;

analyzing, by the network device, the plurality of transaction records to identify the network entities within the plurality of transaction records, wherein the network entities are identified as text strings using text-based analysis;

generating, by the network device, a crafted corpus comprising a sequence of network entities within the plurality of transaction records, wherein the crafted corpus is generated based on a type of access semantics to be captured by an embedding and based on a selected corpus category;

generating, by the network device, a network embeddings model based on the crafted corpus of sequences of network entities, wherein the network embeddings model includes a vector space of text that captures contextual similarities of text strings to measures similarities between the network interactions of the plurality of network entities in the embedding space in a manner that indicates access patterns derived from the network interactions;

generating, by the network device, a visualization of the network embeddings model in a reduced space including graphical representations of the access patterns of the plurality of network entities in the communications network, wherein the visualization of the network embeddings model indicates proximities between the plurality of network entities that relates to the measured similarities between the network entities based on the network embeddings model.

2. The method of claim 1, further comprising:
in response to the selected corpus category being a sequence of servers grouped per user, analyzing, for a subset of transaction records within a specified time period, the subset of transaction records to identify a particular user associated with the network interactions;
further analyzing the subset of transaction records associated with the identified user and identifying a sequence of servers identified as text strings within the subset of transaction records for the identified user; and
generating a crafted corpus including a sequence of servers by grouping the servers extracted from the subset of transaction records for the identified user, wherein the network embeddings from the crafted corpus of sequence of servers define a vector space for servers and another vector space for users.

3. The method of claim 2, wherein the specified time period is one of: a session for the identified user; a day; time between an identified log-on and corresponding log-off event for the identified user; or the time between an identified request event and corresponding release event for the identified user.

4. The method of claim 3, further comprising:
in response to determining a lapse in time between a first group of transaction records and a second group of transaction records within the subset of transaction records for the identified user, further grouping the servers in the crafted corpus to include a first group of servers and a second group of servers in the sequence of servers in a manner indicating that the network interactions corresponding to the first group of servers and the network interactions corresponding to the second group of servers are unrelated for the identified user.

5. The method of claim 1, further comprising:
in response to the selected corpus category being a sequence of users grouped per server, analyzing, for a subset of transaction records within a specified time period, the subset of transaction records to identify a particular server associated with the network interactions;
further analyzing the subset of transaction records associated with the identified server and identifying a sequence of users identified as text strings within the subset of transaction records for the identified server; and
generating a crafted corpus including a sequence of users by grouping the users extracted from the subset of transaction records for the identified server, wherein the network embeddings from the crafted corpus of sequence of users define a vector space for users and another vector space for servers.

6. The method of claim 4, wherein the specified time period is a day.

7. The method of claim 1, further comprising:
in response to the selected corpus category being a sequence of users grouped per a group of servers, analyzing, for a subset of transaction records within a specified time period, the subset of transaction records to identify a particular group of servers associated with the network interactions;
further analyzing the subset of transaction records associated with the identified group of servers and identifying a sequence of users identified as text strings within the subset of transaction records for the identified group of servers; and
generating a crafted corpus including a sequence of users by grouping the users extracted from the subset of transaction records for the identified group of servers, wherein the network embeddings from the crafted corpus of sequence of users grouped per a group of servers define a vector space for users and another vector space for servers.

8. The method of claim 6, wherein the specified time period is a day, and the network embeddings model allows a relationship to be derived between the sequence of users and the group of servers, within the group of servers, and within the sequence of users.

9. The method of claim 1, wherein generating the network embeddings model further comprises:
extracting each text string within the crafted corpus;
generating a vector representation of network entities within the crafted corpus based on the extracted text string, wherein each vector represents semantics of the network entities; and
capturing contextual similarities between text strings using the vector space of text which indicates contextual similarities between network entities and similarities between the network interactions of the similar network entities over time in a manner that derives access patterns for the network entities in the vector space.

10. The method of claim 9, wherein generating the visualization of the network embeddings model further comprises:
translating the network embeddings model in a multidimensional space into the visualization generated in a reduced space using a Natural Language Processing (NLP) driven visualization technique.

11. The method of claim 10, wherein the reduced space is a two-dimensional space (2D) or a three-dimensional (3D) space, and the NLP driven visualization technique is a modeling mechanism which reduces the multidimensional space though a mathematical technique.

12. The method of claim 11, further comprising:
analyzing the generated visualization of the network embeddings model including representations of access patterns of the plurality of network entities in the communications network in a manner that detects suspicious access patterns based on a deviation in the network embeddings model; and
updating the visualization of the network embeddings model to include graphical representations of the detected suspicious access patterns.

13. The method of claim 12, wherein the visualization of the network embeddings model includes interactive elements configured to receive user input that is applied to updating the visualization of the network embeddings model.

14. The method of claim 13, further comprising:
generating data related to the visualization of the network embeddings model in a manner that indicates outliers based on the network embeddings model in response to the received user input indicating the outliers.

15. The method of claim 14, wherein the data comprises at least of: an update to the visualization removing the outliers; an alert; an indication of incidents of interest; an indication relating to the deviation in the network embeddings model.

16. The method of claim 1, wherein the plurality of transaction records are related to at least one of: network transaction logs; deep packet inspection (DPI) based flow records; intent to access messages; and discovery protocol messages.

17. The method of claim 1, wherein the network embeddings are generated using a Natural Language Processing (NLP) driven learning semantics technique comprising at least one of: word embeddings; character embeddings; and sentence embeddings.

18. The method of claim 7, wherein analyzing a subset of transaction records within a specified time period further comprises:
regularizing the subset of transaction records in manner that represents the corresponding network interactions using natural language terminology.

19. The method of claim 18, wherein regularizing the subset of transaction records comprises:
replacing at least one parameter in each of the transaction records with a corresponding encoded term determined to represent the at least one parameter using natural language terminology; and
generating the crafted corpus using the regularized subset of transaction records having at least one parameter replaced with the corresponding encoded, wherein the crafted corpus is formulated using natural language terminology.

20. The method of claim 1, wherein the crafted corpus comprises a collection of network entities within the analyzed plurality of transaction records that is selectively formulated to include the particular network entities intended to be captured in a unified embedding space.

* * * * *